(12) United States Patent
Koyama

(10) Patent No.: US 10,924,789 B2
(45) Date of Patent: Feb. 16, 2021

(54) DISPLAY CONTROL APPARATUS, CONTROL METHOD FOR DISPLAY CONTROL APPARATUS, AND NON-TRANSITORY COMPUTER READABLE MEDIUM

(71) Applicant: CANON KABUSHIKI KAISHA, Tokyo (JP)

(72) Inventor: Jun Koyama, Tokorozawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/508,589

(22) Filed: Jul. 11, 2019

(65) Prior Publication Data

US 2020/0029111 A1 Jan. 23, 2020

(30) Foreign Application Priority Data

Jul. 18, 2018 (JP) .............................. JP2018-134914

(51) Int. Cl.
*H04N 21/258* (2011.01)
*G06T 19/00* (2011.01)
*H04N 21/234* (2011.01)

(52) U.S. Cl.
CPC ......... *H04N 21/258* (2013.01); *G06T 19/006* (2013.01); *H04N 21/234* (2013.01)

(58) Field of Classification Search
CPC ............................ G06T 19/006; H04N 21/258
See application file for complete search history.

(56) References Cited

U.S. PATENT DOCUMENTS

2019/0295285 A1* 9/2019 Shinohara ................. G06T 7/73

FOREIGN PATENT DOCUMENTS

JP 2017-121082 A 7/2017

* cited by examiner

*Primary Examiner* — Girumsew Wendmagegn
(74) *Attorney, Agent, or Firm* — Venable LLP

(57) ABSTRACT

A display control apparatus includes: a playback unit to play back a moving image; a display control unit to display a display region; an first acquisition unit to acquire information relating to an attitude of a display unit; a reception unit to receive an operation to modify the display region of the moving image displayed; and a control unit (1) to stop playback of the moving image and modify the display region, in a case where the reception unit receives a first predetermined operation during playback of the moving image, and (2) to modify the display region in accordance with the attitude without stopping playback of the moving image, in a case where variation in the attitude is detected on the basis of the information acquired by the first acquisition unit during playback of the moving image.

12 Claims, 13 Drawing Sheets

DISPLAY CONTROL APPARATUS, CONTROL METHOD FOR DISPLAY CONTROL APPARATUS, AND NON-TRANSITORY COMPUTER READABLE MEDIUM

BACKGROUND OF THE INVENTION

Field of the Invention

The present invention relates to a display control apparatus, a control method for the display control apparatus, and a non-transitory computer readable medium.

Description of the Related Art

In recent years, imaging apparatuses that are capable of shooting images with a wider range than the view angle of a human, such as omnidirectional images and 360-degree images, have become widespread. Moreover, a method for realizing highly immersive, highly realistic display by displaying a part of this type of wide-range image on a display unit and modifying the range (the display range) of the image displayed on the display unit in response to variation in the attitude of the apparatus has been proposed.

Japanese Patent Application Publication No. 2017-121082 proposes a method for controlling a time axis of a moving image shot using an omnidirectional (360-degree) camera in response to tilting of a head-mounted display from an initial angle when displaying the moving image on the head-mounted display.

SUMMARY OF THE INVENTION

When an omnidirectional (360-degree) moving image is displayed and viewed, a user can enjoy a video by playing back a part of the 360-degree (omnidirectional) image. Further, the user can modify the display region by operating a screen in accordance with conditions.

However, when the display region is modified in an attempt to check the peripheral landscape or conditions while viewing an omnidirectional moving image, an event occurring outside the display region may be missed. Hence, when the user misses an event s/he wanted to see, s/he must rewind the playback position on the time axis of the moving image.

An object of the present invention is therefore to improve operability when modifying a display region during playback of a moving image.

The present invention in its first aspect provides a display control apparatus comprising:
a playback unit configured to play back a moving image;
a display control unit configured to display a display region on a display unit, wherein the display region is a partial region of the played-back moving image;
an first acquisition unit configured to acquire information relating to an attitude of the display unit;
a reception unit configured to receive an operation to modify the display region of the moving image displayed on the display unit; and
a control unit configured:
to stop playback of the moving image and modify the display region, in a case where the reception unit receives a first predetermined operation during playback of the moving image, and
to modify the display region in accordance with the attitude without stopping playback of the moving image, in a case where variation in the attitude is detected on the basis of the information acquired by the first acquisition unit during playback of the moving image.

The present invention in its second aspect provides a control method for a display control apparatus, the control method comprising:
playing back a moving image;
displaying a display region on a display unit, wherein the display region is a partial region of the played-back moving image;
acquiring information relating to an attitude of the display unit;
receiving an operation to modify the display region of the moving image displayed on the display unit; and
stopping playback of the moving image and modify the display region, in a case where the reception unit receives a first predetermined operation during playback of the moving image, and
modifying the display region in accordance with the attitude without stopping playback of the moving image, in a case where variation in the attitude is detected on the basis of the information acquired by the first acquisition unit during playback of the moving image.

The present invention in its third aspect provides a non-transitory computer readable medium that stores a program, wherein the program causes a computer to execute: a control method for a display control apparatus, the control method comprising:
playing back a moving image;
displaying a display region on a display unit, wherein the display region is a partial region of the played-back moving image;
acquiring information relating to an attitude of the display unit;
receiving an operation to modify the display region of the moving image displayed on the display unit; and
stopping playback of the moving image and modify the display region, in a case where the reception unit receives a first predetermined operation during playback of the moving image, and
modifying the display region in accordance with the attitude without stopping playback of the moving image, in a case where variation in the attitude is detected on the basis of the information acquired by the first acquisition unit during playback of the moving image.

According to the present invention, operability can be improved when modifying a display region during playback of a moving image.

Further features of the present invention will become apparent from the following description of exemplary embodiments with reference to the attached drawings.

DESCRIPTION OF THE EMBODIMENTS

First Embodiment

<Overall Configuration>

Figure 1A:
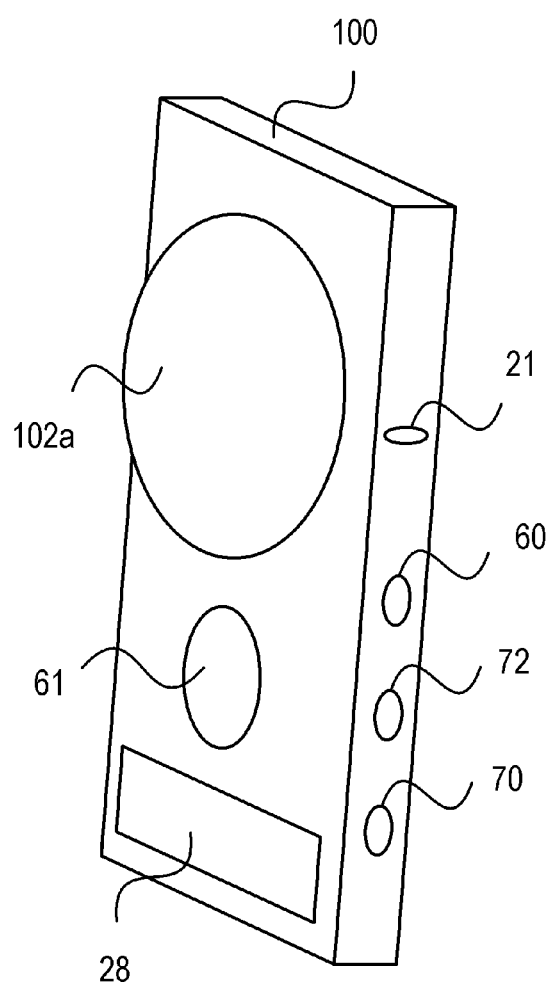
FIGS. 1A to 1C are external views and a function block diagram of a digital camera according to an embodiment.
Figure 1B:
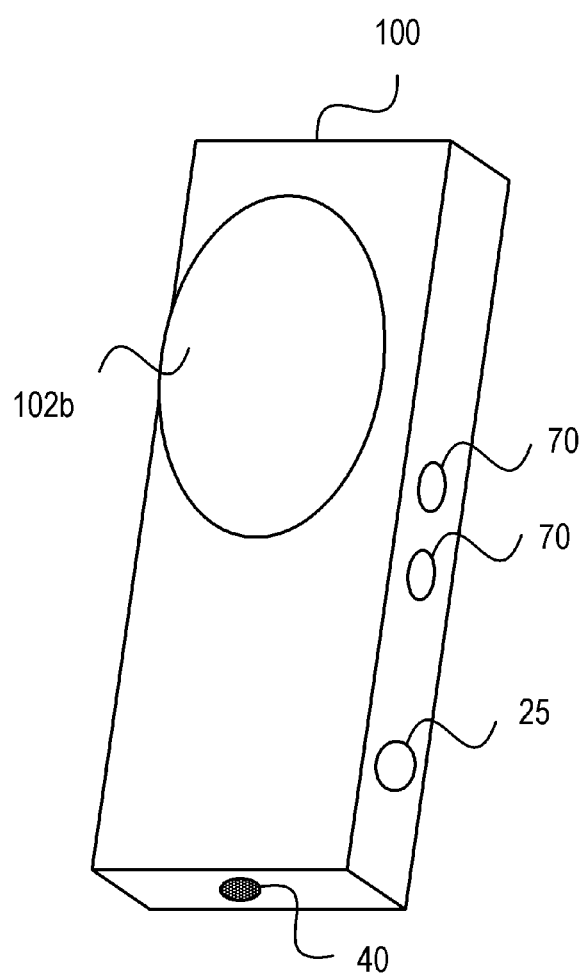

Preferred embodiments of the present invention will be described below with reference to the figures. FIG. 1A is a front surface perspective view (an external view) of a digital camera 100 (an imaging apparatus). FIG. 1B is a rear surface perspective view (an external view) of the digital camera 100. The digital camera 100 is a camera (an omnidirectional camera or a 360-degree camera) that shoots omnidirectional images (360-degree images).

A barrier 102a serves as a protective window for a front camera portion in which the front of the digital camera 100 serves as a shooting range. The front camera portion is a wide-angle camera portion having a wide range of at least 180 degrees upward, downward, leftward, and rightward on the front side of the digital camera 100, for example, as a shooting range. A barrier 102b serves as a protective window for a rear camera portion in which the rear of the digital camera 100 serves as the shooting range. The rear camera portion is a wide-angle camera portion having a wide range of at least 180 degrees upward, downward, leftward, and rightward on the rear side of the digital camera 100, for example, as a shooting range.

A display unit 28 displays images and various information. A shutter button 61 is an operating unit (an operating member) for executing a shooting instruction. A mode-switching switch 60 is an operating unit for switching between various modes. A connection I/F 25 is a connector for connecting a connection cable to the digital camera 100, and using the connection cable, an external apparatus such as a smartphone, a personal computer, or a television apparatus is connected to the digital camera 100. An operation unit 70 is constituted by various switches, buttons, dials, touch sensors, and so on for receiving various operations from a user. A power source switch 72 is a push button for switching a power source ON and OFF.

A light-emitting unit (a light-emitting member) 21 is constituted by a light-emitting diode (an LED) or the like and notifies the user of various states of the digital camera 100 through emission patterns and emission colors. A fixing portion 40 is constituted by a tripod screw hole, for example, and is used to dispose the digital camera 100 fixedly by means of a fixing tool such as a tripod.

Figure 1C:
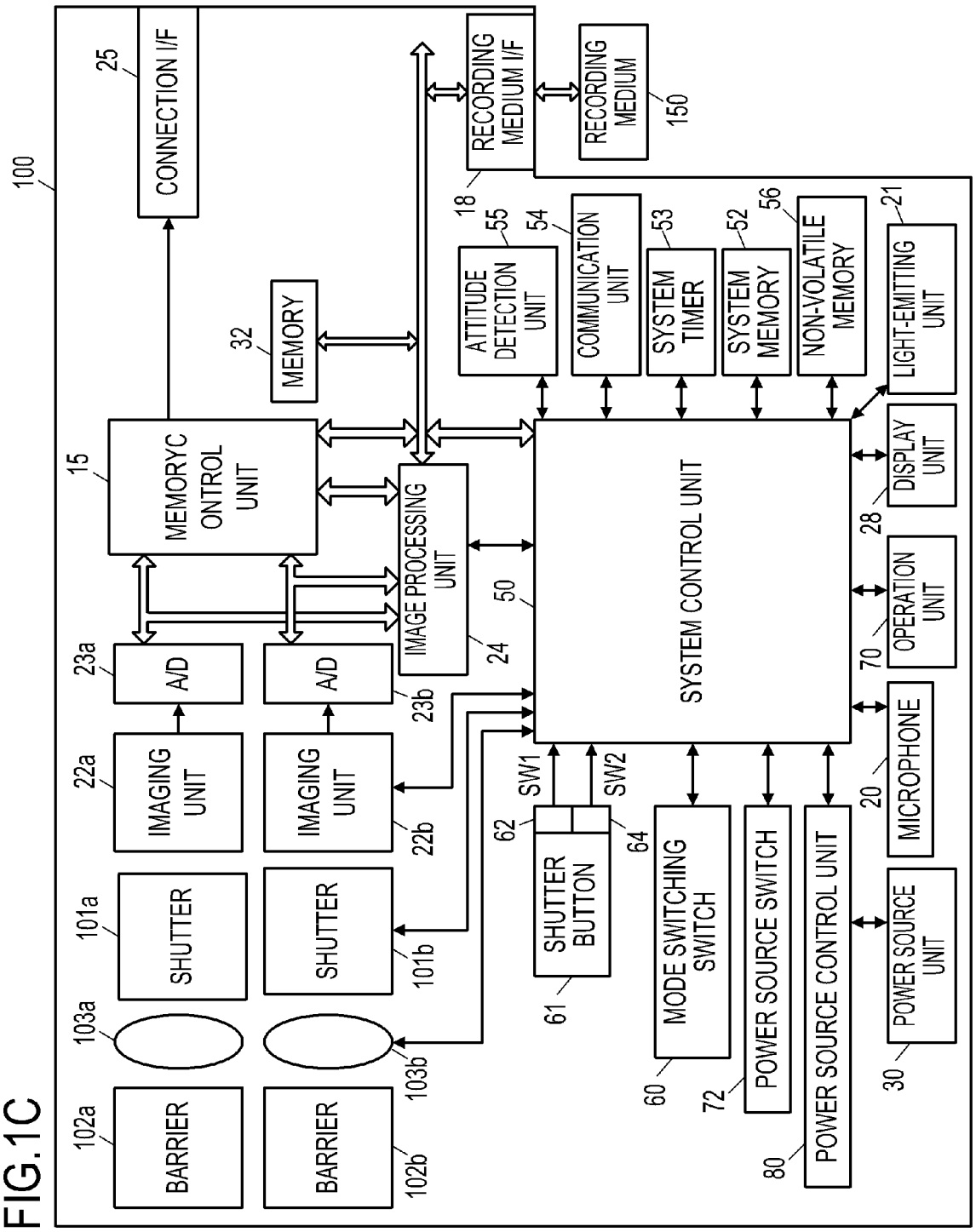

FIG. 1C is a block diagram showing an example configuration of the digital camera 100.

The barrier 102a covers an imaging system (a photographic lens 103a, a shutter 101a, an imaging unit 22a, and so on) of the front camera portion to prevent the imaging system from soiling and damage. The photographic lens 103a is constituted by a lens group including a zoom lens and a focus lens and is a wide-angle lens. The shutter 101a is a shutter having an aperture function for adjusting an amount of object light incident on the imaging unit 22a. The imaging unit 22a is an imaging element constituted by a CCD, a CMOS element, or the like for converting an optical image into an electric signal. An A/D converter 23a converts an analog signal output from the imaging unit 22a into a digital signal. Note that instead of providing the barrier 102a, the outer surface of the photographic lens 103a may be exposed, and the other parts of the imaging system (the shutter 101a and the imaging unit 22a) may be prevented from soiling and damage by the photographic lens 103a.

The barrier 102b covers an imaging system (a photographic lens 103b, a shutter 101b, an imaging unit 22b, and so on) of the rear camera portion to prevent the imaging system from soiling and damage. The photographic lens 103b is constituted by a lens group including a zoom lens and a focus lens and is a wide-angle lens. The shutter 101b is a shutter having an aperture function for adjusting an amount of object light incident on the imaging unit 22b. The imaging unit 22b is an imaging element constituted by a CCD, a CMOS element, or the like for converting an optical image into an electric signal. An A/D converter 23b converts an analog signal output from the imaging unit 22b into a digital signal. Note that instead of providing the barrier 102b, the outer surface of the photographic lens 103b may be exposed, and the other parts of the imaging system (the shutter 101b and the imaging unit 22b) may be prevented from soiling and damage by the photographic lens 103b.

VR (Virtual Reality) images are captured by the imaging unit 22a and the imaging unit 22b. VR images are assumed to be images with which VR display can be realized. VR images are assumed to include omnidirectional images (360-degree images) captured by an omnidirectional camera (a 360-degree camera), panorama images having a wider video range (effective video range) than a display range that can be displayed at one time on a display unit, and so on. VR images include not only static images but also moving images and live view images (images acquired from a camera substantially in real time). A VR image has a video range (an effective video range) corresponding to a field of view of a maximum of 360 degrees in an up-down direction (vertical angle, angle from the zenith, elevation angle, depression angle, and altitude angle) and 360 degrees in a left-right direction (horizontal angle and azimuth angle).

VR images are also assumed to include images that are less than 360 degrees in the up-down direction and less than 360 degrees in the left-right direction but have a wide-range angle of view (view field range) that is wider than the angle of view that can be shot by a normal camera or a wider video range (effective video range) than the display range that can be displayed at one time on a display unit. For example, an image shot using a 360-degree camera that is capable of shooting an object covering a view field (an angle of view) of 360 degrees in the left-right direction (the horizontal angle and the azimuth angle) and a vertical angle of 210 degrees, centering on the zenith, is a type of VR image. Further, for example, an image shot using a 360-degree camera that is capable of shooting an object covering a view field (an angle of view) of 180 degrees in the left-right direction (the horizontal angle and the azimuth angle) and a vertical angle of 180 degrees, centering on a horizontal direction, is a type of VR image. In other words, any image having a video range covering a view field of at least 160 degrees (±80 degrees) in each of the up-down direction and the left-right direction, which is a wider video range than the range that can be visually recognized by a human at one time, is a type of VR image.

When a VR image is displayed by VR display (displayed in the display mode "VR view"), an omnidirectional video with no seams in the left-right direction (a horizontal rotation direction) can be viewed by varying the attitude of the display apparatus (the display apparatus displaying the VR image) in a left-right rotation direction. In the up-down direction (a vertical rotation direction), an omnidirectional video with no seams can be viewed within a range of ±105 degrees when seen from directly above (the zenith), but a range exceeding 105 degrees from directly above forms a blank region in which no video exists. A VR image may also be regarded as "an image in which the video range forms at least a part of a virtual space (a VR space)".

VR display (VR view) is a display method (a display mode) for displaying a video of a partial viewing range (a display range or a display region) of a VR image corresponding to the attitude of the display apparatus in such a manner that the display range can be modified. When a head-mounted display (an HMD) serving as the display apparatus is worn and viewed, a video having a view field range corresponding to the orientation of the face of the user is displayed. For example, it is assumed that at a certain point in time, a video of a VR image having a view field angle (an image angle) centering on 0 degrees (a specific bearing, north, for example) in the left-right direction and 90 degrees (90 degrees from the zenith, i.e. horizontal) in the up-down direction is displayed. When the attitude of the display apparatus is turned the other way around from this state (for example, when the display surface is modified from a southward orientation to a northward orientation), the display range is modified to a video of the same VR image having a view field angle centering on 180 degrees (the opposite bearing, south, for example) in the left-right direction and 90 degrees (horizontal) in the up-down direction. In terms of a case in which the user is viewing an HMD, when the user moves his/her face from north to south (in other words, turns around), the video displayed on the HMD also changes from a video of the north to a video of the south. By performing VR display in this manner, the user can be provided with the visual sensation of actually being inside the VR image (the VR space). A smartphone mounted on VR goggles (a head-mounted adapter) may be regarded as a type of HMD.

Note that the VR image display method is not limited to the method described above, and the display range may be moved (scrolled) in response to a user operation on a touch panel, a direction button, or the like rather than attitude variation. During VR display (in the VR view mode), processing for modifying the display range in response to attitude variation and processing for modifying the display range in response to a touch-move operation performed on a touch panel or a dragging operation performed on an operating member such as a mouse may both be executed.

An image processing unit 24 executes predetermined processing (pixel interpolation, resizing processing such as reduction, color conversion processing, and so on) on data from the A/D converter 23a and the A/D converter 23b or data from a memory control unit 15. The image processing unit 24 also executes predetermined calculation processing using captured image data. A system control unit 50 executes exposure control and distance measurement control on the basis of a calculation result acquired by the image processing unit 24. As a result, TTL (through-the-lens) type AF (autofocus) processing, AE (automatic exposure) processing, EF (flash preliminary emission) processing, and so on are executed. The image processing unit 24 also executes predetermined calculation processing using the captured image data and executes TTL type AWB (auto-white balance) processing on the basis of the acquired calculation result. Further, the image processing unit 24 generates a single VR image by implementing basic image processing on two images (fisheye images) acquired by the A/D converter 23a and the A/D converter 23b and executing image connection processing for synthesizing the two images subjected to the basic image processing. Furthermore, during VR display in the live view mode or during playback, the image processing unit 24 executes image extraction processing, enlargement processing, distortion correction, and so on in order to display the VR image by VR display, and executes rendering for rendering the processing result in a predetermined storage area of a memory 32.

In the image connection processing, the image processing unit 24 uses one of the two images as a reference image and uses the other as a comparison image, calculates an amount of deviation between the reference image and the comparison image in each area by pattern matching processing, and detects connection positions for connecting the two images on the basis of the amount of deviation in each area. The image processing unit 24 then corrects the distortion in each image by geometric transformation, taking into account the detected connection positions and the lens characteristics of the respective optical systems. As a result, the respective images are transformed into 360-degree format images. The image processing unit 24 then generates a single 360-degree image (a VR image) by synthesizing (blending) the two 360-degree format images. The generated 360-degree image is an image using equidistant cylindrical projection, for example, and therefore the position of each pixel of the 360-degree image can be associated with a coordinate on a surface of a sphere (the VR space).

The output data from the A/D converters 23a, 23b is written to the memory 32 via the image processing unit 24 and the memory control unit 15 or via the memory control unit 15. The memory 32 stores image data acquired by the imaging units 22a, 22b and converted into digital data by the A/D converters 23a, 23b, and image data to be output to an external display apparatus from the connection I/F 25. The memory 32 has sufficient storage capacity to store a predetermined number of static images as well as moving images and sound of a predetermined length.

The memory 32 also serves as an image display memory (a video memory). The image display data stored in the memory 32 can be output to an external display apparatus from the connection I/F 25. By successively transferring VR images captured by the imaging units 22a, 22b, generated by the image processing unit 24, and accumulated in the memory 32 to an external display apparatus and displaying the VR images thereon, an electronic viewfinder function can be realized, and as a result, live view display (LV display) can be realized. An image displayed by live view display will be referred to hereafter as a live view image (an LV image). Live view display (remote LV display) can be realized similarly by successively transferring the VR images accumulated in the memory 32 to an external apparatus (a smartphone or the like) connected wirelessly via a communication unit 54 and displaying the images thereon.

A non-volatile memory 56 serves as an electrically erasable/recordable recording medium and is constituted by an EEPROM or the like, for example. Constants, a program, and so on used in operations of the system control unit 50 are recorded in the non-volatile memory 56. In this case, the program is a computer program for executing various flowcharts to be described below in this embodiment.

The system control unit 50 is a control unit having at least one processor or circuit, and controls the entire digital camera 100. The system control unit 50 realizes the processing of this embodiment, to be described below, by executing the program recorded in the non-volatile memory 56, as described above. A system memory 52 is a RAM, for example, and the system control unit 50 expands the constants and variables used in the operations of the system control unit 50, the program read from the non-volatile memory 56, and so on in the system memory 52. The system control unit 50 also performs display control by controlling the memory 32, the image processing unit 24, the memory control unit 15, and so on. A system timer 53 is a time measurement unit that measures the time used for various types of control and the time on an inbuilt clock.

The mode-switching switch 60, the shutter button 61, the operation unit 70, and the power source switch 72 are used to input various operation instructions into the system control unit 50.

The mode-switching switch 60 switches the operating mode of the system control unit 50 to one of a static image recording mode, a moving image shooting mode, a playback mode, a communication connection mode, and so on. Modes included in the static image recording mode include an automatic shooting mode, an automatic scene discrimination mode, a manual mode, an aperture priority mode (an Av mode), a shutter speed priority mode (a Tv mode), and a program AE mode (a P mode). Various scene modes serving as shooting settings for different shooting scenes, a custom mode, and so on also exist. The user can switch between these modes directly using the mode-switching switch 60. Alternatively, the mode-switching switch 60 may be used to switch to a shooting mode list screen, whereupon another operating member is used to switch selectively to one of a plurality of modes displayed on the display unit 28. The moving image shooting mode likewise includes a plurality of modes.

The shutter button 61 includes a first shutter switch 62 and a second shutter switch 64. The first shutter switch 62 is switched ON when the shutter button 61 is half-pressed (i.e. in response to a shooting preparation instruction) midway through an operation thereof, whereby a first shutter switch signal SW1 is generated. In response to the first shutter switch signal SW1, the system control unit 50 starts shooting preparation operations such as AF (autofocus) processing, AE (automatic exposure) processing, AWB (automatic white balance) processing, and EF (flash preliminary emission) processing. The second shutter switch 64 is switched ON when the shutter button 61 is fully pressed (i.e. in response to a shooting instruction) at the end of the operation thereof, whereby a second shutter switch signal SW2 is generated. In response to the second shutter switch signal SW2, the system control unit 50 starts operations of a series of shooting processes from reading signals from the imaging units 22a, 22b to writing image data to a recording medium 150.

Note that the shutter button 61 is not limited to an operating member that can be operated in two stages, namely half-pressed and fully pressed, and may also be an operating member that can only be pressed down in a single stage. In this case, the shooting preparation operations and the shooting processing are executed continuously when the shutter button 61 is pressed down in a single stage. This operation is identical to an operation performed when a shutter button that can be half-pressed and fully pressed is fully pressed (so that the first shutter switch signal SW1 and the second shutter switch signal SW2 are generated substantially simultaneously).

By selectively operating various function icons and choices displayed on the display unit 28 and so on, the operation unit 70 acts as various function buttons to which appropriate functions are allocated in accordance with the scene. Examples of function buttons include a stop button, a return button, an image feed button, a jump button, a refine button, a property modification button, an INFO button, and so on. For example, when a menu button is pressed, various settable menu screens are displayed on the display unit 28. The user can perform various setting operations intuitively by operating the operation unit 70 while viewing the menu screen displayed on the display unit 28.

The power source switch 72 is a push button for switching the power source ON and OFF. A power source control unit 80 is constituted by a battery detection circuit, a DC-DC converter, a switch circuit for switching a block to be energized, and so on, and is used to detect the presence of an installed battery, the type of the battery, and the state of charge of the battery. Further, the power source control unit 80 controls the DC-DC converter on the basis of the detection results and an instruction from the system control unit 50 so that a required voltage is supplied to respective parts, including the recording medium 150, for a required period. A power source unit 30 is constituted by a primary battery such as an alkali battery or a lithium battery, a secondary battery such as an NiCd battery, an NiMH battery, or an Li battery, an AC adapter, or the like.

A recording medium I/F 18 is an interface with the recording medium 150, which is constituted by a memory card, a hard disk, or the like. The recording medium 150 is a recording medium such as a memory card for recording shot images and is constituted by a semiconductor memory, an optical disk, a magnetic disk, or the like. The recording medium 150 may be either a replaceable recording medium that can be attached to and detached from the digital camera 100 or a recording medium that is built into the digital camera 100.

The communication unit 54 exchanges video signals, sound signals, and so on with an external apparatus connected thereto either wirelessly or by a wire cable. The communication unit 54 can also be connected to a wireless LAN (Local Area Network) or the Internet so as to communicate with an external apparatus (a server or the like) on a network over the network. The communication unit 54 can also communicate with an external apparatus by Bluetooth (registered trademark) or Bluetooth Low Energy. The communication unit 54 is capable of transmitting images (including LV images) captured by the imaging units 22a, 22b and images recorded in the recording medium 150 and receiving images and various other types of information from the external apparatus.

An attitude detection unit 55 detects the attitude of the digital camera 100 relative to the direction of gravity. On the basis of the attitude detected by the attitude detection unit 55, it is possible to determine whether an image shot by the imaging units 22a, 22b is an image shot with the digital camera 100 held horizontally or an image shot with the digital camera 100 held vertically. It is also possible to determine whether an image shot by the imaging units 22a, 22b is an image shot with the digital camera 100 tilted in a rotation direction such as a yaw direction, a pitch direction, or a roll direction, and to determine the magnitude of the tilt. The system control unit 50 is capable of attaching orientation information corresponding to the attitude detected by the attitude detection unit 55 to an image file of a VR image captured by the imaging units 22a, 22b and recording the image after rotating the image (adjusting the orientation of the image so as to correct the tilt). An acceleration sensor, a gyro sensor, a geomagnetic sensor, a bearing sensor, an altitude sensor, and so on can be used alone or in combination of two or more as the attitude detection unit 55. Using the acceleration sensor, gyro sensor, bearing angle sensor, and so on constituting the attitude detection unit 55, movement of the digital camera 100 (panning, tilting, raising, whether or not the digital camera 100 is stationary, and so on) can also be detected.

A microphone 20 collects sound on the periphery of the digital camera 100, which is recorded as the sound of a VR image constituted by a moving image (a VR moving image). The connection I/F 25 is a connection plug to which an HDMI (registered trademark) cable, a USB cable, or the like is connected in order to connect the digital camera 100 to an external apparatus and exchange video therewith.

Figure 2A:
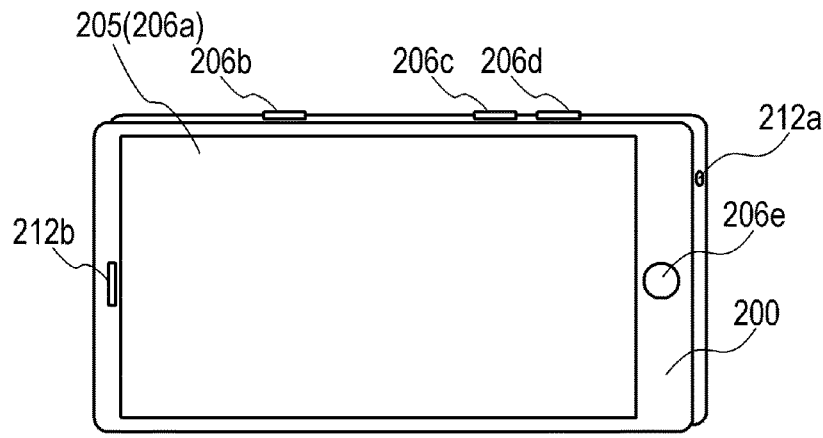
FIGS. 2A to 2C are external views and a function block diagram of a display control device according to this embodiment.

FIG. 2A is an external view of a display control apparatus 200 serving as an example of an electronic device according to this embodiment. The display control apparatus 200 may be formed using a smartphone or the like. A display unit 205 displays images and various information. The display unit 205 is formed integrally with a touch panel 206a so that touch operations performed on a display surface of the display unit 205 can be detected. The display control apparatus 200 is capable of displaying VR images (VR content) generated by the digital camera 100 or the like by VR display on the display unit 205. An operation unit 206b is constituted by a power button for receiving operations to switch a power source of the display control apparatus 200 ON and OFF. An operation unit 206c and an operation unit 206d are volume buttons for increasing and reducing the volume of sound output from a sound output unit 222. An operation unit 206e is a home button for displaying a home screen on the display unit 205. A sound output terminal 212a is a headphone jack, i.e. a terminal for outputting sound signals to headphones, external speakers, or the like. A speaker 212b is built into the main body of the apparatus in order to output sound.

Figure 2B:
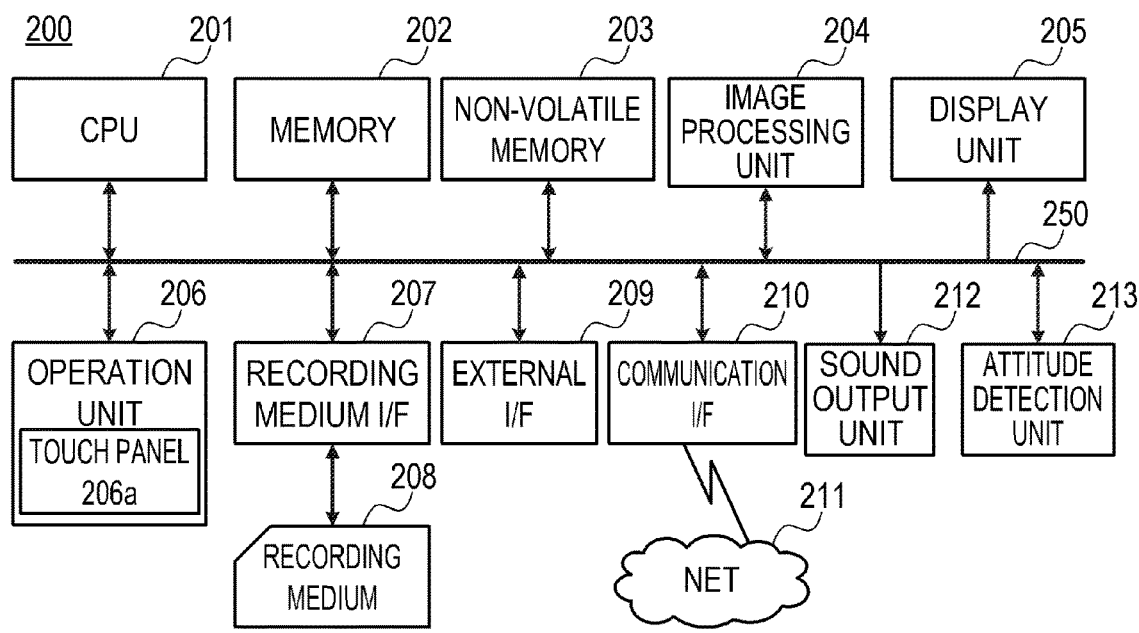

FIG. 2B is a block diagram showing an example configuration of the display control apparatus 200. A CPU 201, a memory 202, a non-volatile memory 203, an image processing unit 204, the display unit 205, the operation unit 206, a recording medium I/F 207, an external I/F 209, and a communication I/F 210 are connected to an internal bus 250. The sound output unit 212 and an attitude detection unit 213 are also connected to the internal bus 250. The respective units connected to the internal bus 250 are configured to be capable of exchanging data with each other via the internal bus 250.

The CPU 201 is a control unit for controlling the entire display control apparatus 200 and is constituted by at least one processor or circuit. The memory 202 is constituted by a RAM (a volatile memory using a semiconductor element or the like), for example. For example, the CPU 201 controls the respective parts of the display control apparatus 200 in accordance with a program stored in the non-volatile memory 203 using the memory 202 as a work memory. Image data, sound data, other data, various programs used in the operations of the CPU 201, and so on are stored in the non-volatile memory 203. The non-volatile memory 203 is constituted by a flash memory, a ROM, or the like, for example.

On the basis of the control of the CPU 201, the image processing unit 204 implements various types of image processing on images stored in the non-volatile memory 203 and a recording medium 208, image signals acquired via the external I/F 209, images acquired via the communication I/F 210, and so on. The image processing implemented by the image processing unit 204 includes A/D conversion processing, D/A conversion processing, image data encryption processing, image data compression processing, image data decoding processing, enlargement/reduction processing (resizing), noise reduction processing, color conversion processing, and so on. Furthermore, various types of image processing such as panoramic development and mapping processing, conversion, and so on are executed on VR images, i.e. omnidirectional images or wide-range images which, although not omnidirectional, include wide-range data. The image processing unit 204 may be constituted by a dedicated circuit block for implementing specific image processing. Moreover, depending on the types of image processing, the CPU 201 can implement the image processing in accordance with a program instead of using the image processing unit 204.

On the basis of the control of the CPU 201, the display unit 205 displays images, a GUI screen constituting a GUI (a Graphical User Interface), and so on. The CPU 201 generates a display control signal in accordance with a program, and controls the respective parts of the display control apparatus 200 so that an image signal to be displayed on the display unit 205 is generated and output to the display unit 205. The display unit 205 displays an image on the basis of the generated image signal. Note that the configuration of the electronic device according to this embodiment only extends to an interface for outputting an image signal to be displayed on the display unit 205, and the display unit 205 may be constituted by an external monitor (a television apparatus, an HMD, or the like).

The operation unit 206 is an input device for receiving user operations and includes an alphabetic character information input device such as a keyboard, a pointing device such as a mouse or a touch panel, a button, a dial, a joystick, a touch sensor, a touch pad, and so on. In this embodiment, the operation unit 206 includes the touch panel 206a and the operating units 206b, 206c, 206d, and 206e.

The recording medium 208, which is constituted by a memory card, a CD, a DVD, or the like, can be attached to and detached from the recording medium I/F 207. On the basis of the control of the CPU 201, the recording medium I/F 207 reads data from the attached recording medium 208 and writes data to the recording medium 208. For example, the recording medium 150 in which a 360-degree image generated by the digital camera 100 is recorded can be attached as the recording medium 208. In this case, the image signal of the VR image can be read from the recording medium 208 and displayed on the display unit 205. The external I/F 209 is an interface for connecting the display control apparatus 200 to an external apparatus either by a wire cable or wirelessly and inputting/outputting video signals and sound signals. The communication I/F 210 is an interface for communicating with an external apparatus, the Internet 211, or the like in order to exchange various types of data, such as files and commands, therewith.

The sound output unit 212 outputs the sound of a moving image or music data, operation sounds, a ringtone, various notification sounds, and so on. The sound output unit 212 is assumed to include a sound output terminal 212*a* for connecting headphones or the like and a speaker 212*b*, but the sound output unit 212 may perform sound output by means of wireless communication or the like.

The attitude detection unit 213 detects the attitude of the display control apparatus 200 relative to the direction of gravity. On the basis of the attitude detected by the attitude detection unit 213, it is possible to determine whether the display control apparatus 200 is being held horizontally or vertically, whether the display control apparatus 200 is in an upwardly oriented, downwardly oriented, or diagonal attitude, and so on. It is also possible to determine the existence and magnitude of tilting of the display control apparatus 200 in a rotation direction such as a yaw direction, a pitch direction, or a roll direction, whether the display control apparatus 200 has been rotated in the relevant rotation direction, and so on. An acceleration sensor, a gyro sensor, a geomagnetic sensor, a bearing sensor, an altitude sensor, and so on can be used alone or in combination of two or more as the attitude detection unit 213. Note that when the electronic device according to this embodiment is a separate apparatus to a display apparatus (when the display unit 205 is an external monitor), the attitude detection unit 213 may be provided in the display apparatus instead of the electronic device.

As described above, the operation unit 206 includes the touch panel 206*a*. The touch panel 206*a* is an input device formed in a planar shape and overlaid onto the display unit 205 so that coordinate information corresponding to a touched position is output therefrom. The CPU 201 is capable of detecting the following operations or states input into the touch panel 206*a*.

- A finger or a pen that has not yet touched the touch panel 206*a* newly touches the touch panel 206*a*, or in other words, a touch begins (referred to hereafter as a touch-down)
- The finger or pen is in a state of touching the touch panel 206*a* (referred to hereafter as a touch-on)
- The finger or pen is moved while touching the touch panel 206*a* (referred to hereafter as a touch-move)
- The finger or pen touching the touch panel 206*a* is removed from the touch panel 206*a*, or in other words, the touch ends (referred to hereafter as a touch-up)
- Nothing touches the touch panel 206*a* (referred to hereafter as a touch-off)

When a touch-down is detected, a touch-on is detected at the same time. Normally, following a touch-down, the touch-on is detected continuously until a touch-up is detected. Likewise when a touch-move is detected, a touch-on is detected at the same time. Even after a touch-on is detected, a touch-move is not detected unless the touch position is moved. When it is detected that all touching fingers and pens have performed a touch-up, a touch-off is detected.

The CPU 201 is notified of these operations and states, as well as the coordinates of the position in which the finger or pen is touching the touch panel 206*a*, via an internal bus, and on the basis of the notified information, the CPU 201 determines the nature of the operation (the touch operation) being performed on the touch panel 206*a*. With regard to a touch-move, the movement direction in which the finger or pen moves over the touch panel 206*a* can be determined for each vertical component and each horizontal component on the touch panel 206*a* on the basis of variation in the position coordinates. When a touch-move of at least a predetermined distance is detected, it is determined that a sliding operation has been performed.

An operation in which a finger is moved quickly by a certain distance while touching the touch panel 206*a* and then removed from the touch panel 206*a* is known as a flick. In other words, a flick is an operation for quickly stroking the touch panel 206*a* with a finger in a flicking motion. When a touch-move of at least a predetermined distance and at least a predetermined speed is detected and a touch-up is detected immediately thereafter, it can be determined that a flick has been performed (it can be determined that a flick has been performed following a sliding operation).

Further, a touch operation in which a plurality of locations (two points, for example) are touched simultaneously and then the touch positions are brought closer together is known as a pinch-in, while a touch operation in which the touch operations are moved further away from each other is known as a pinch-out. A pinch-in and a pinch-out are referred to collectively as a pinching operation (or simply as a pinch). The touch panel 206*a* may use any of various systems, such as a resistive film system, an electrostatic capacitance system, a display acoustic wave system, an infrared system, an electromagnetic induction system, an image recognition system, or an optical sensor system. Either a system that detects contact with the touch panel as a touch or a system that detects the approach of a finger or a pen toward the touch panel as a touch may be used.

Figure 2C:
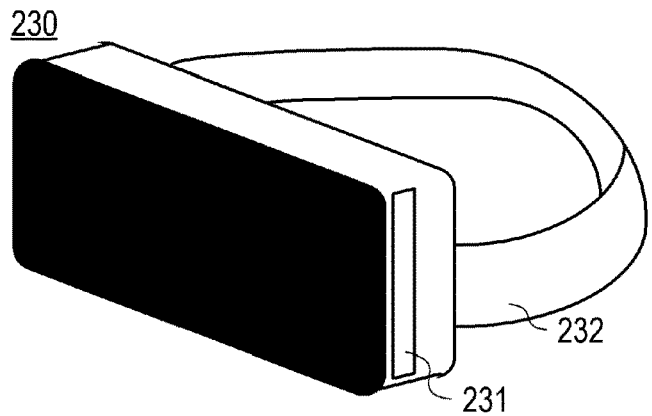

FIG. 2C is an external view of a pair of VR goggles (a head-mounted adapter) 230 to which the display control apparatus 200 can be attached. By attaching the display control apparatus 200 to the VR goggles 230, the display control apparatus 200 can be used as a head-mounted display. An insertion port 231 is an insertion port for inserting the display control apparatus 200. The entire display control apparatus 200 can be inserted into the VR goggles 230 such that the display surface of the display unit 205 is oriented toward the side of a headband 232 for fixing the VR goggles 230 to the head of the user (in other words, a user side). While wearing the VR goggles 230 to which the display control apparatus 200 is attached on the head, the user can see the display unit 205 without holding the display control apparatus 200 by hand. In this case, when the user moves his/her head or entire body, the attitude of the display control apparatus 200 also varies. The attitude detection unit 213 detects the variation in the attitude of the display control apparatus 200 at this time, and on the basis of the attitude variation, the CPU 201 performs processing for realizing VR display. In this case, detecting the attitude of the display control apparatus 200 using the attitude detection unit 213 is equivalent to detecting the attitude of the head of the user (the direction in which the line of sight of the user is oriented).

<States During Shooting>

Figure 3A:
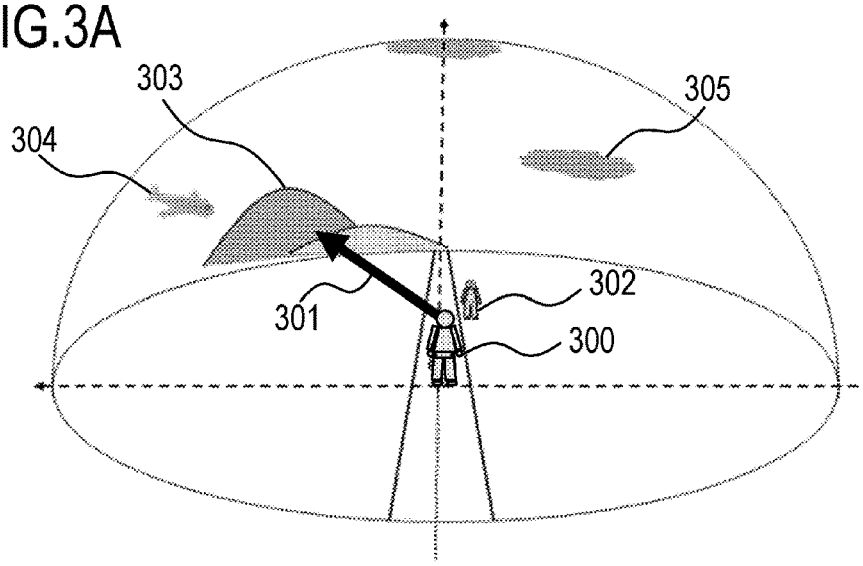
FIGS. 3A to 3C are views showing peripheral conditions when shooting an omnidirectional moving image according to this embodiment.
Figure 3B:
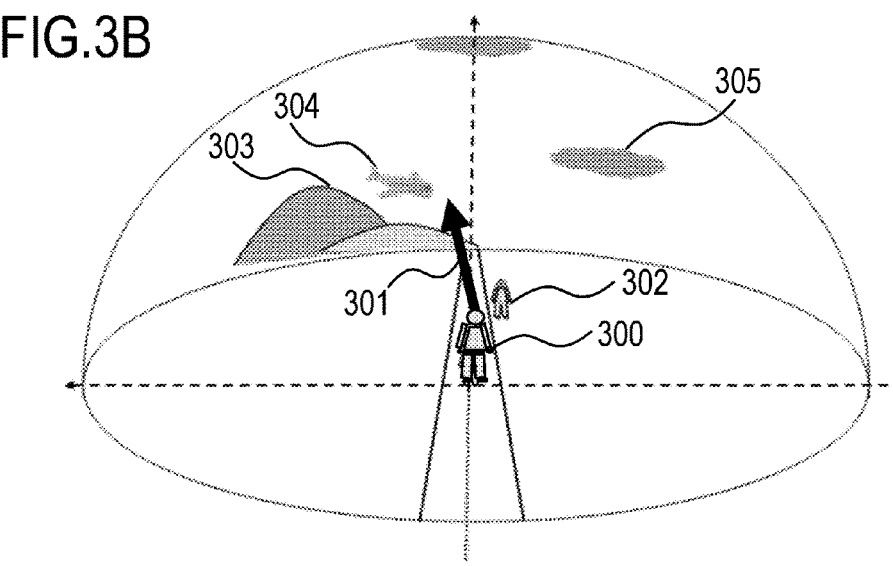
Figure 3C:
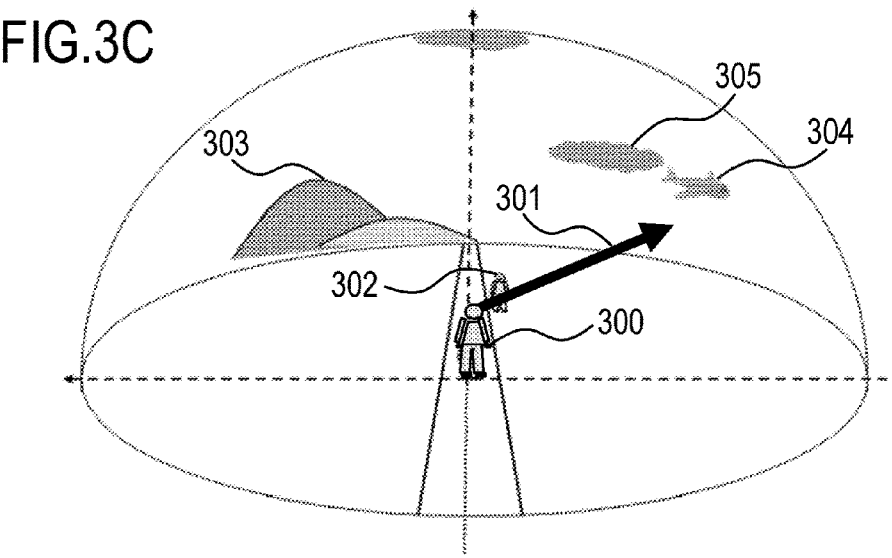

FIGS. 3A to 3C show a moving image photographer 300 operating the digital camera 100 and states on the periphery thereof when an omnidirectional (360-degree) moving image according to this embodiment is shot. FIG. 3A shows a state at the start of the operation to shoot the omnidirectional moving image according to his embodiment. FIG. 3B shows a state within a certain time slot between the start and end of the shooting operation according to this embodiment. FIG. 3C shows a state at the end of the operation to shoot the omnidirectional moving image according to his embodiment. The omnidirectional moving image according to this embodiment is an omnidirectional moving image acquired when the moving image photographer 300 performs shooting using the digital camera 100.

In FIGS. 3A to 3C, an arrow 301 represents the orientation of the photographic lens 103*a* and indicates the direction recognized as the front surface of the digital camera 100 during shooting of the omnidirectional image. In this embodiment, the front direction, i.e. the direction recognized as the front surface of the digital camera 100 during shooting, is stored in association with the moving image data. The orientation of the arrow 301 (the orientation of the photographic lens 103*a*) varies so as to follow an airplane 304 across FIGS. 3A to 3C. Note that a person 302, a mountain 303, the airplane 304, and a cloud 305 serve as examples of objects shot using the digital camera 100 described above.

<Screen Displays During Playback>

Figure 4A:
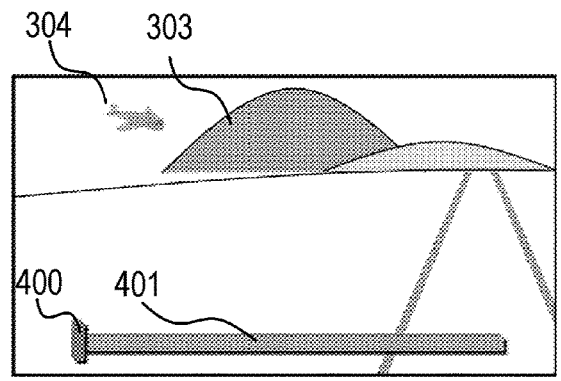
FIGS. 4A to 4D are views showing playback screens of the omnidirectional moving image according to this embodiment.
Figure 4B:
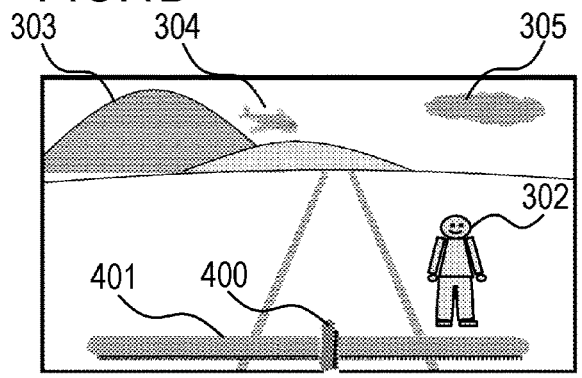
Figure 4C:
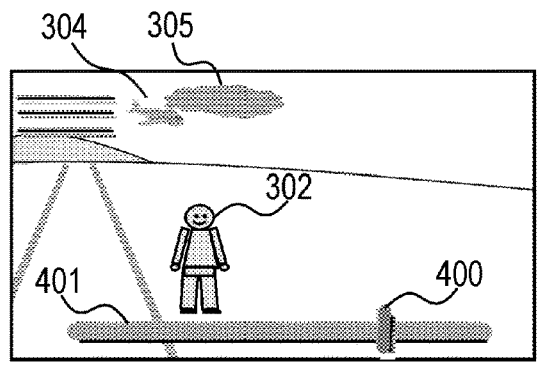
Figure 4D:
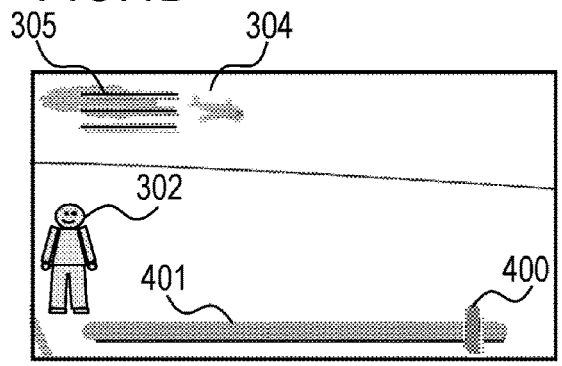

FIGS. 4A to 4D show examples of displays in a case where the orientation of the goggles is not varied from the start of playback while playing back an omnidirectional moving image using the display control apparatus 200. FIG. 4A shows an example display at the start of playback of the omnidirectional moving image according to this embodiment (corresponding to FIG. 3A). FIG. 4B shows an example display within a certain time slot between the start and end of the shooting operation according to this embodiment (corresponding to FIG. 3B). FIG. 4D shows a state at the end of the operation to shoot the omnidirectional moving image according to this embodiment (corresponding to FIG. 3C). Note that FIG. 4C shows an example display within a time slot between FIG. 3B and FIG. 3C.

In FIGS. 4A to 4D, a progress bar 400 indicates the current playback position of the entire omnidirectional moving image on a time axis. A progress bar 401 represents a period of the entire omnidirectional moving image. The left end of the progress bar 401 indicates the start of the moving image, the center indicates a playback position halfway through the entire omnidirectional moving image along the time axis, and the right end indicates the end of the moving image.

When the omnidirectional moving image is played back using the display control apparatus 200, a display region serving as a partial region of (each frame of) the omnidirectional moving image is displayed on the display unit 205. Further, at the start of playback, a region including a front direction region of the omnidirectional moving image is displayed on the display unit 205. The user can modify the display region of the omnidirectional moving image displayed on the display unit 205 by varying the attitude of the display control apparatus 200 and operating the touch panel 206*a*. The display control apparatus 200 also modifies the display region automatically so that following the start of playback of the omnidirectional moving image, the front direction region of the omnidirectional moving image is displayed on the display unit 205.

<Processing Content>

Next, playback processing according to this embodiment will be described in detail. In this embodiment, the display control apparatus 200 temporarily stops playback of the omnidirectional moving image after detecting a predetermined operation, namely an operation performed by the user to modify the display region, during playback of the moving image, and modifies the display region in accordance with the predetermined operation. When the predetermined operation is complete, the display control apparatus 200 resumes playback of the moving image. Here, the predetermined operation according to this embodiment is a sliding operation and may also be regarded as an operation for modifying the sightline within the omnidirectional moving image without an accompanying attitude modification. Further, the sliding operation includes a touch-move operation performed on the touch panel 206*a*, a dragging operation, which is an operation for moving the mouse while pressing a button on the mouse, an operation of a direction key, and so on. An example in which a touch-move operation is performed as the predetermined operation will be described below.

More specifically, the display control apparatus 200 temporarily stops playback of the moving image after detecting a touch-down operation, i.e. the start of a touch-move operation (the predetermined operation). Further, the display control apparatus 200 modifies the display region in accordance with the touch-move serving as the predetermined operation. Furthermore, in this embodiment, the display control apparatus 200 determines that the operation for modifying the display region is complete and resumes playback of the moving image after detecting a touch-up operation. In other words, playback of the moving image is resumed when the touch-move operation (the predetermined operation) is completed. Moreover, in this embodiment, when it is detected that the user has varied the attitude of the display control apparatus 200 during playback of the omnidirectional moving image, processing is performed to modify the display region in accordance with the detected attitude variation without temporarily stopping playback of the moving image. Note that in a case where a dragging operation performed on the mouse serves as the predetermined operation, playback of the moving image is temporarily stopped when an operation to press the button on the mouse is performed, i.e. at the start of the predetermined operation, whereupon the display region is modified by moving the mouse while pressing the button. Playback of the moving image is then resumed when an operation to release the button on the mouse is performed, i.e. at the end of the predetermined operation. Similarly, in a case where an operation of a direction key is performed as the predetermined operation, playback of the moving image is temporarily stopped when an operation to press the direction key is performed, i.e. at the start of the predetermined operation, whereupon the display region is modified by continuing to press the direction key. Playback of the moving image is then resumed when an operation to release the direction key is performed, i.e. at the end of the predetermined operation.

Figure 5:
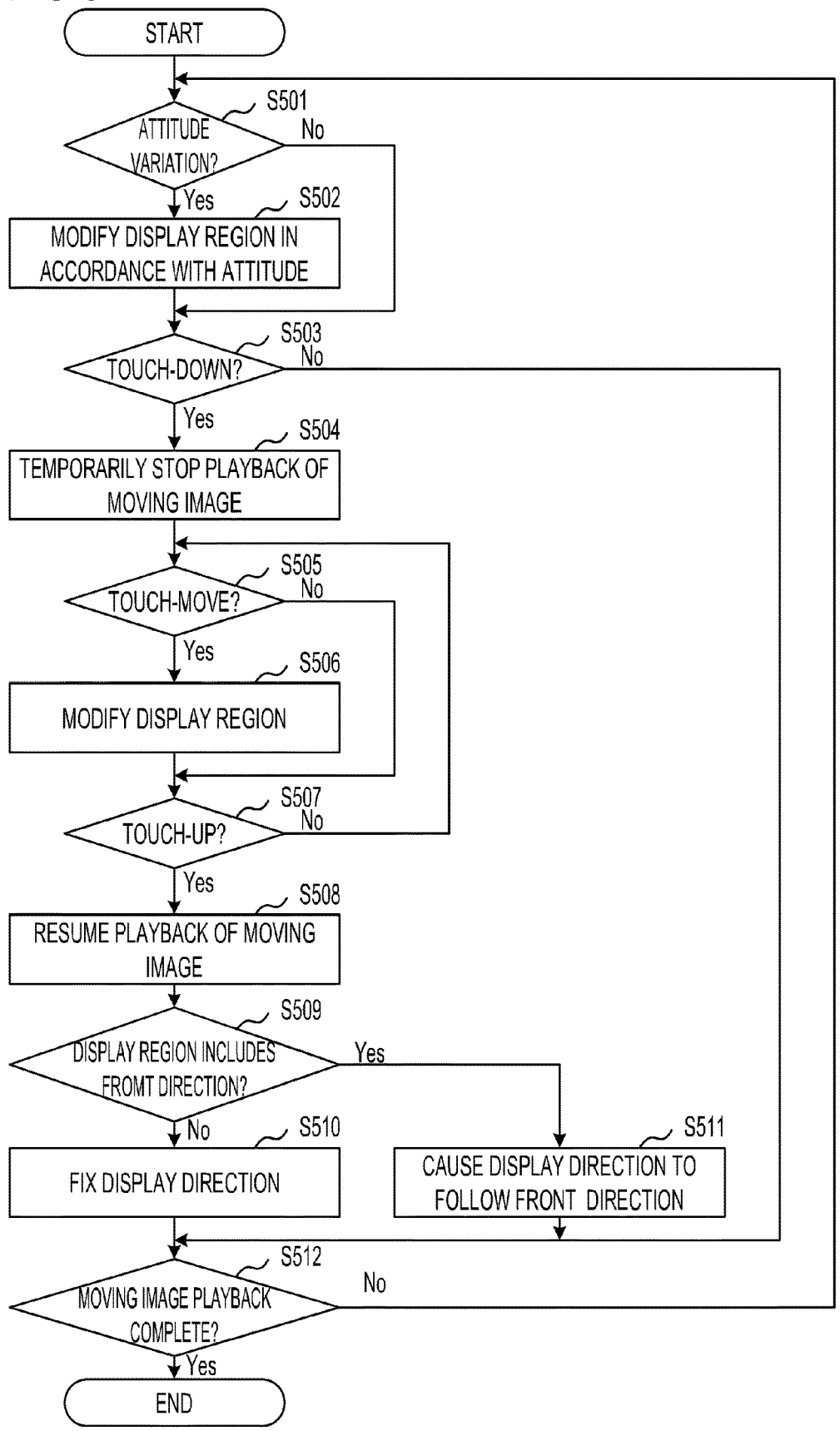
FIG. 5 is a flowchart showing an example of playback processing according to a first embodiment.

FIG. 5 is a flowchart showing playback processing according to this embodiment. This processing is realized by having the CPU 201 expand the program stored in the non-volatile memory 203 in the memory 202 and execute the program. The processing shown in FIG. 5 is started when the power of the display control apparatus 200 is switched ON, an omnidirectional moving image recorded in the recording medium 208 or an omnidirectional moving image acquired from a communication destination is selected, and playback is specified. When playback begins, the CPU 201 detects the front direction of the omnidirectional moving image at the start of playback on the basis of the information attached to the file of the omnidirectional moving image to be played back. The CPU 201 then extracts a display region (a display range) including the front direction region from each frame of the omnidirectional moving image and displays the extracted region on the display unit 205. If no variation is detected in the attitude of the display control apparatus 200 following the start of playback of the omnidirectional moving image, the CPU 201 successively detects the front direction of the moving image and displays a display region including the front direction region on the display unit 205.

In S501, the CPU 201 determines whether or not variation in the attitude of the display control apparatus 200 has been detected by the attitude detection unit 213. When attitude variation has been detected, the processing advances to S502, and when attitude variation has not been detected, the processing advances to S503. In S502, the CPU 201 modifies the display region of the omnidirectional moving image displayed on the display unit 205 in accordance with the attitude variation detected by the attitude detection unit 213. For example, the CPU 201 modifies the display region in accordance with attitude variation occurring in the display control apparatus 200 when the display control apparatus 200 is mounted in a pair of VR goggles (a head-mounted adapter) and used as an HMD and the wearer of the HMD changes the orientation of his/her head. Here, when varying the display region of the omnidirectional moving image in response to attitude variation, the CPU 201 modifies the display region while continuing playback, i.e. without temporarily stopping playback of the omnidirectional moving image.

In S503, the CPU 201 determines whether or not a touch-down operation for modifying the display region has been performed on the touch panel 206a. When a touch-down operation has been performed, the processing advances to S504, and when a touch-down has not been performed, the processing advances to S512. Here, there are no particular limitations on the method of determining whether or not a touch-down for modifying the display region has been performed, and a touch operation performed on a region other than the operating unit on the touch panel 206a, for example, may be regarded as a touch-down operation for modifying the display region.

In S504, the CPU 201 temporarily stops playback of the omnidirectional moving image. The CPU 201 then displays the frame at the time of the temporary stoppage (a temporary stop screen) on the display unit 205.

In S505, the CPU 201 determines whether or not a touch-move operation has been performed on the touch panel 206a. When a touch-move operation has been performed, the processing advances to S506, and when a touch-move operation has not been performed, the processing advances to S507. In S506, the CPU 201 modifies the display region of the omnidirectional moving image currently displayed on the display unit 205 in accordance with the direction and movement amount of the touch-move operation.

At this time, the omnidirectional moving image remains in a temporarily stopped state. Accordingly, the user can modify the display region to a desired region while checking the screen displayed as a static image. In this embodiment, when a move operation is performed on the touch panel 206a in the up-down direction, the display region is rotated in the pitch direction, and when a move operation is performed in the left-right direction, the display region is rotated in the yaw direction. Note that in the example described in this embodiment, the display region is not changed when variation in the attitude of the display control apparatus 200 is detected during a touch operation, but the CPU 201 may modify the display region in response to attitude variation regardless of whether or not a touch operation is underway.

In S507, the CPU 201 determines whether or not a touch-up operation on the touch panel 206a has been detected. When a touch-up operation has been detected, the processing advances to S508, and when a touch-up operation has not been detected, the processing returns to S505. In S508, the CPU 201 cancels the temporarily stopped state of the omnidirectional moving image and resumes playback of the moving image.

In S509, the CPU 201 determines whether or not the display region at the point where playback of the moving image was resumed in S508 includes the front direction region of the omnidirectional moving image. When the front direction region is not included, the processing advances to S510, and when the front direction region is included, the processing advances to S511. Note that the front direction region according to this embodiment is a region within a predetermined area from the center of the image captured by the photographic lens 103a. As described above, in this embodiment, the front direction, i.e. the direction recognized as the front surface of the digital camera 100 during shooting of the moving image, is stored in association with the data of the omnidirectional moving image. Hence, in S509, the CPU 201 detects the front direction of the frame at the point where playback of the omnidirectional moving image was resumed. The CPU 201 also detects the display region immediately before the resumption of playback of the omnidirectional moving image and determines whether or not the detected display region includes the front direction region of the frame at the point where playback of the moving image was resumed.

In S510, after resuming moving image playback, the CPU 201 fixes the display direction, i.e. the direction of the display region of the omnidirectional moving image, at the display direction immediately before the resumption of moving image playback (a fixed display direction mode). Thereafter, the CPU 201 extracts the display region from the omnidirectional moving image and displays the extracted display region so that the display direction does not vary even in response to variation in the front direction of the omnidirectional moving image being played back. More specifically, the display region is corrected in response to variation in the yaw direction and pitch direction orientation of the digital camera 100 at the time of shooting so as to cancel out this variation. Thus, after modifying the display region, the user can continue to view only the specific direction that the user wishes to view, regardless of the attitude of the digital camera 100 at the time of shooting. Fixing the display direction as described above may also be regarded as displaying a specific direction with respect to an object of the moving image in the display region.

In S511, after resuming moving image playback, the CPU 201 causes the display direction to follow the front direction at the time of shooting (a display direction following mode). In other words, the display region is modified automatically so that a region including the front direction region of the omnidirectional moving image serves as the display region.

In S512, the CPU 201 determines whether or not playback of the omnidirectional moving image is complete. When playback is complete, playback of the omnidirectional moving image is terminated, and when playback is not complete, the processing returns to S501. Note that the completion of playback of the omnidirectional moving image includes a case in which the moving image has been played back to the end, a case in which an operation performed by the user to stop playback has been received, and so on, for example.

Figure 6A:
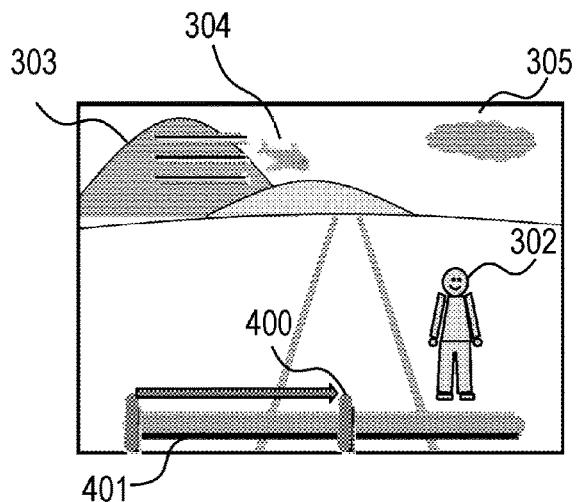
FIGS. 6A to 6F are views showing playback screens of an omnidirectional moving image according to the first embodiment.
Figure 6B:
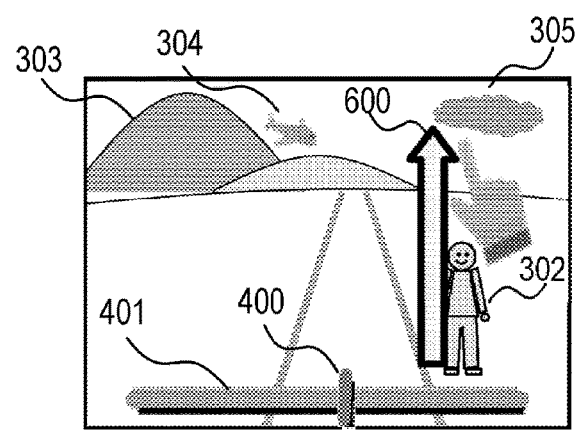

Using FIGS. 6A to 6F, an operational example of the playback processing according to this embodiment will be described. FIG. 6A shows a display screen at a point where a fixed amount of time has elapsed following the start of playback of the omnidirectional moving image. On a display screen shown in FIG. 6B, an upward sliding operation indicated by an arrow 600 has been performed as an instruction to modify the display region during moving image playback. Accordingly, the CPU 201 determines that a touch-down has been performed (S503—Yes) and temporarily stops playback of the moving image (S504). The CPU 201 then determines that a touch-move has been performed (S505—Yes).

Figure 6C:
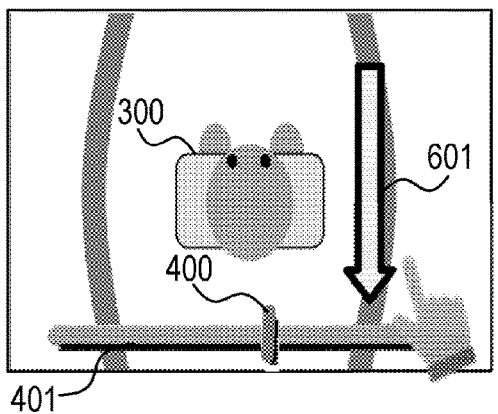
Figure 6D:
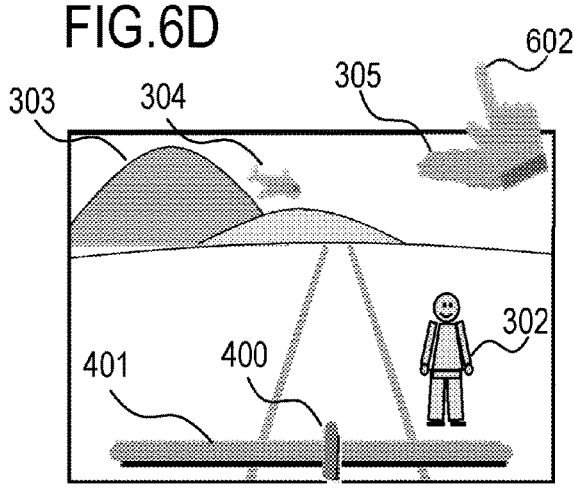
Figure 6E:
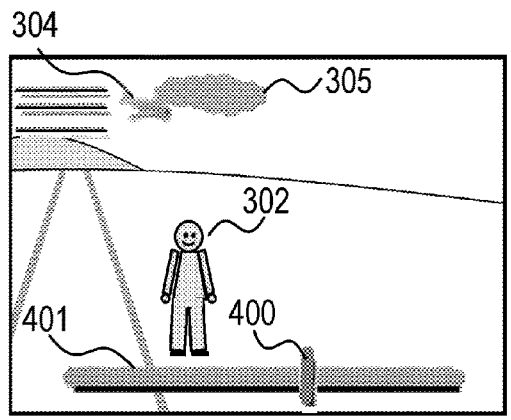
Figure 6F:
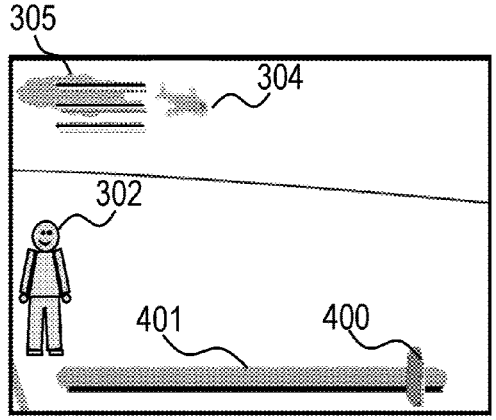

On a display screen shown in FIG. 6C, processing to modify the display region has been implemented in response to the touch-move (S506) so that a region oriented downward in a vertical direction is displayed on the display unit 205. The moving image photographer 300 appears on the display screen shown in FIG. 6C. Further, when a downward sliding operation indicated by an arrow 601 is performed while continuing to touch the touch panel 206a, the CPU 201 determines that a touch-move has been performed (S505—Yes). On a display screen shown in FIG. 6D, the display region has been modified in response to the downward sliding operation (the touch-move) shown in FIG. 6C (S506) so that the front direction region is displayed on the display unit 205. Further, when a touch-up operation 602 shown in FIG. 6D is performed (S507—Yes), the CPU 201 resumes playback of the moving image (S508). Here, the region displayed on the display unit 205 immediately before the resumption of moving image playback is the front direction region (S509—Yes), and therefore the display region at the point where moving image playback was resumed is the front direction region (S511). Accordingly, the display direction is modified automatically to the front direction at the time of shooting of the moving image so that following the resumption of playback of the moving image, regions shown in FIGS. 6E and 6F are displayed on the display unit 205.

Figure 7A:
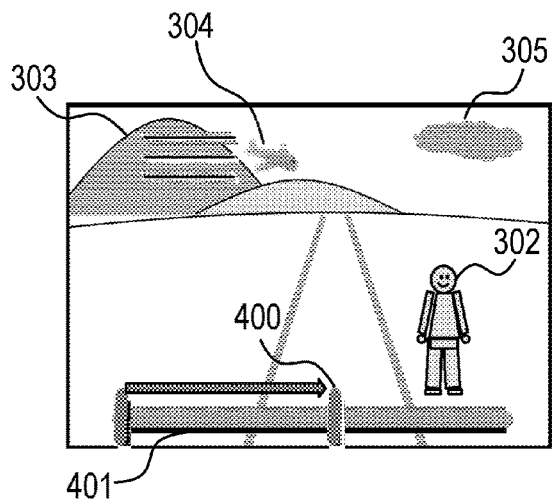
FIGS. 7A to 7F are views showing playback screens of the omnidirectional moving image according to the first embodiment.
Figure 7B:
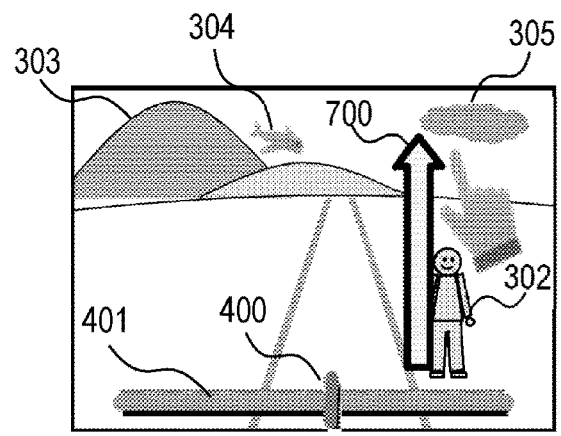

Another operational example of the playback processing according to this embodiment will now be described using FIGS. 7A to 7F. Note that since FIGS. 7A and 7B are similar to FIGS. 6A and 6B, description thereof has been omitted.

Figure 7C:
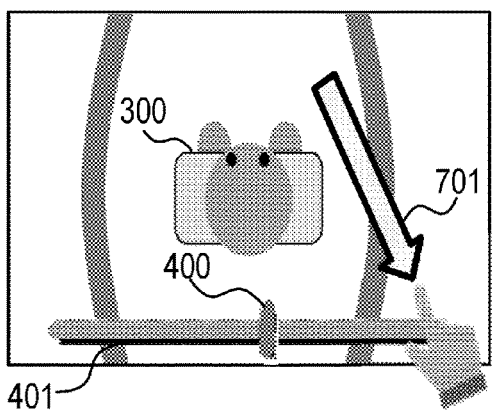
Figure 7D:
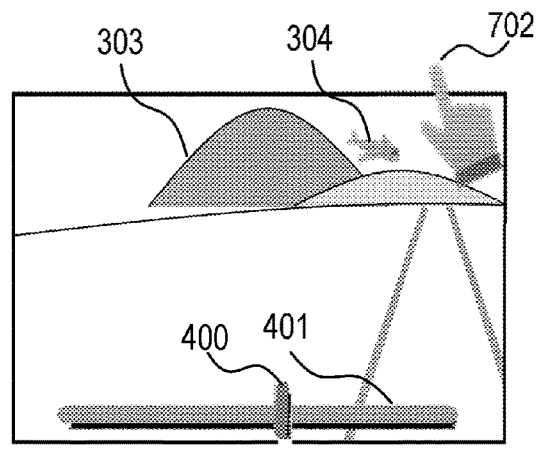
Figure 7E:
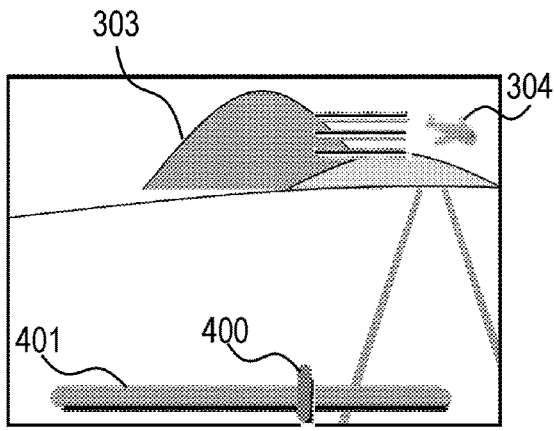
Figure 7F:
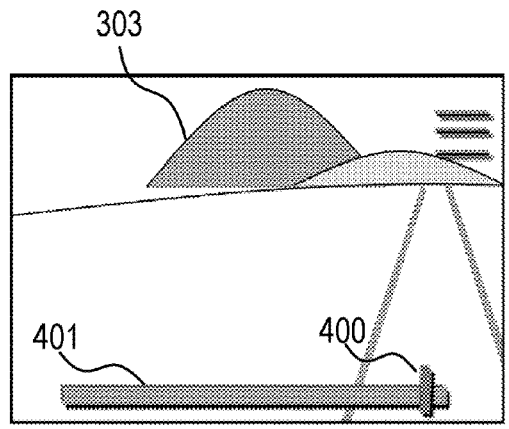

In FIG. 7C, when a diagonally rightward and downward sliding operation indicated by an arrow 701 is performed, the CPU 201 determines that a touch-move operation has been performed (S505—Yes). On a display screen shown in FIG. 7D, the display region has been modified in response to the diagonally rightward and downward sliding operation shown in FIG. 7C (S506) so that a region in a different direction to the front direction is displayed on the display unit 205. Further, when a touch-up operation 702 shown in FIG. 7D is performed, the region displayed on the display unit 205 at that point in time does not include the front direction region (S509-No). Accordingly, the display region corresponding to the display direction at the point where moving image playback was resumed is fixed as the display region thereafter. More specifically, as shown in FIGS. 7E and 7F, a region in the same direction as FIG. 7D is displayed on the display unit 205 as the display region of the moving image following the resumption of playback (S510). In other words, even when the front direction varies during playback of the omnidirectional moving image, the position of the display region is corrected in accordance with the variation amount (the amount of variation in the attitude of the digital camera 100 at the time of shooting) so as to cancel out the attitude variation. As a result, a region in the direction (a specific direction) of the display region immediately before playback of the moving image was resumed is displayed on the display unit 205. Furthermore, when the CPU 201 detects variation in the attitude of the display control apparatus 200 after resuming playback of the moving image, the CPU 201 modifies the display region of the moving image in accordance with the variation in the attitude of the display control apparatus 200 without stopping playback of the moving image.

Advantageous Effects of this Embodiment

According to this embodiment, as described above, when a predetermined operation is performed by the user in order to modify the display region during playback of an omnidirectional moving image, playback of the moving image is temporarily stopped. Playback of the moving image then remains temporarily stopped while the user modifies the display region. Hence, the moving image is not played back while the user modifies the display region, thereby eliminating the need to perform an operation to rewind the playback position along the time axis of the moving image in order to view scenes that were missed while modifying the display region. As a result, a situation in which important scenes are missed can be prevented.

Further, when variation in the attitude of the display control apparatus 200 is detected during playback of the omnidirectional moving image, the display region of the omnidirectional moving image is modified automatically in accordance with the attitude. In this case, playback of the moving image is not stopped, and therefore playback is not stopped in response to every attitude variation while the user watches a VR moving image with the display control apparatus 200 mounted in an HMD.

Furthermore, when the predetermined operation for modifying the display region is complete, playback of the moving image is resumed. When the display region following the resumption of playback of the moving image corresponds to the front direction of the omnidirectional moving image, the front direction region at the time of shooting of the moving image is displayed as the display region. When the display region does not correspond to the front direction, the display region at the point where playback was resumed continues to be displayed. As a result, the user can continue to view the region (the specific direction region) s/he wishes to view.

Second Embodiment

<Outline>

In the example described in the first embodiment, playback of the moving image is resumed when the operation for modifying the display region is completed by performing a touch-up operation. In this embodiment, playback of the moving image is resumed when an operation (a second predetermined operation) for resuming playback of the moving image is detected after detecting a touch-up operation. In this embodiment, a double tap operation, which is an operation for touching the display unit 205 consecutively, will be described as an example of the operation for resuming playback of the moving image. Note that the operation for resuming playback of the moving image is not limited to a double tap operation. Instead, for example, a button for resuming playback of the moving image may be displayed, and playback of the moving image may be resumed by operating the button. Since the digital camera 100 and the display control apparatus 200 according to this embodiment are configured similarly to those of the first embodiment, description thereof has been omitted.

<Processing Content>

Figure 8:
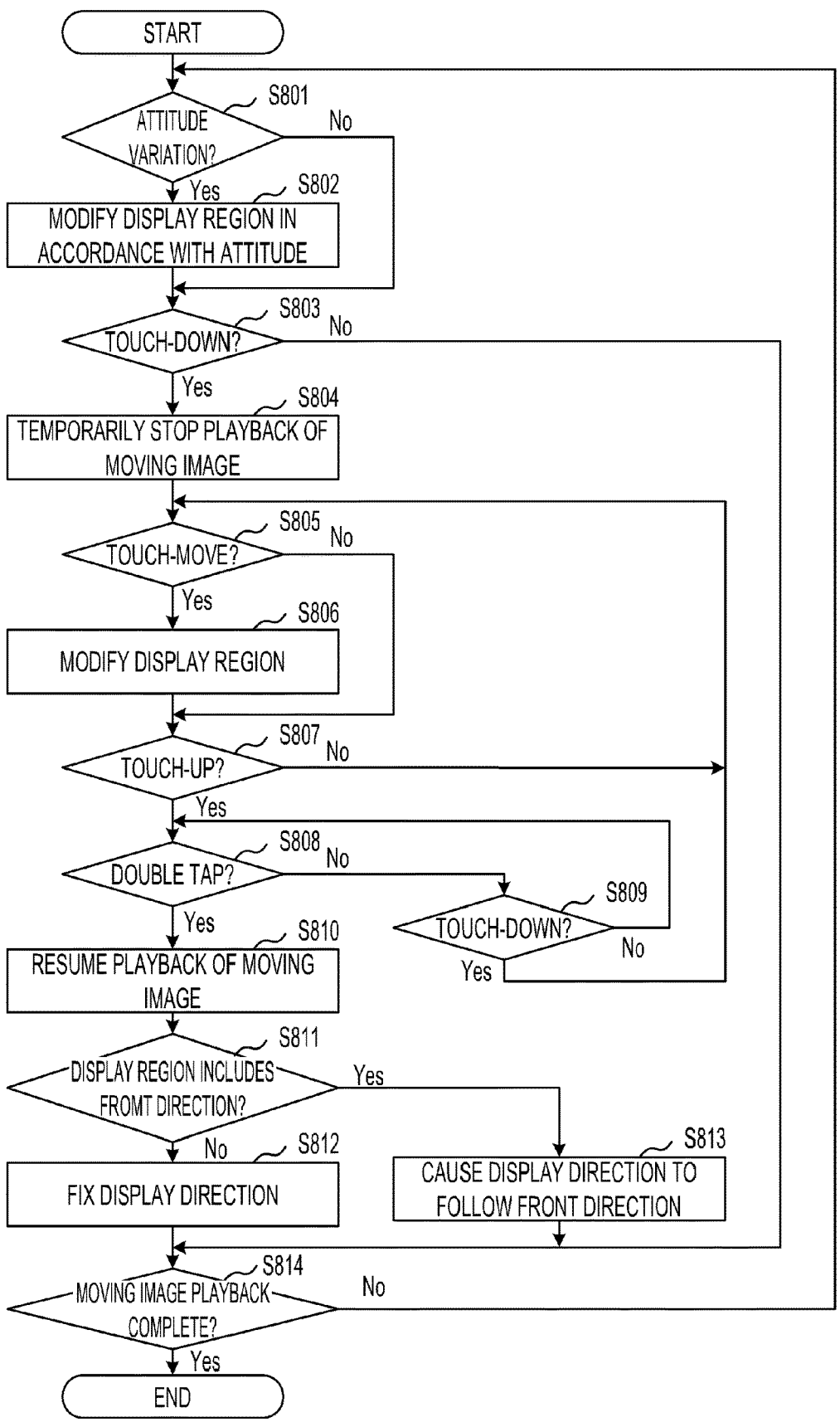
FIG. 8 is a flowchart showing an example of playback processing according to a second embodiment.

FIG. 8 shows a flowchart of the processing executed by the display control apparatus 200 in this embodiment to display an omnidirectional moving image. This processing is realized by having the CPU 201 expand the program stored in the non-volatile memory 203 in the memory 202 and execute the program. The processing shown in FIG. 8 is started when the power of the display control apparatus 200 is switched ON, an omnidirectional moving image is selected from the images recorded in the recording medium 208 or images acquired from a communication destination, and playback is specified. Processing executed in S801 to S807 and S810 to S814 of FIG. 8 is similar to the processing executed in S501 to S507 and S508 to S512 of FIG. 5, and therefore description thereof has been omitted.

In S808, the CPU 201 determines whether or not a double tap operation has been performed after detecting the touch-up operation in S807. When a double tap operation has been performed, the processing advances to S810, where playback of the moving image is resumed. When a double tap operation has not been performed, the processing advances to S809.

In S809, the CPU 201 determines whether or not a touch-down operation has been performed. When a touch-down operation has been detected, the processing returns to S805, where a touch-move operation for moving the display region is detected. When a touch-down operation has not been detected, the processing returns to S808.

According to this embodiment, as described above, after the display region is moved in response to a touch-move operation and a touch-up operation is performed, playback remains in the temporarily stopped state until a double tap operation is performed. Thus, playback of the moving image can be resumed at a timing desired by the user. Note that this embodiment may be configured such that when the operation (a double tap) for resuming playback of the moving image is performed, playback of the moving image is resumed and the display region is reset. Resetting the display region means modifying the display region from the current display region to a predetermined display region. Hence, by setting the front direction region, for example, as the predetermined display region displayed following a reset, moving image playback can be started while returning the display region to the front direction. Note that the operation for resuming playback of the moving image is not limited to a double tap. Instead, for example, a button (not shown) for returning (resetting) the display region may be provided, and by operating the button, the display region may be reset and playback of the moving image may be resumed.

Third Embodiment

<Outline>

In the example described in the first embodiment, playback of the moving image is resumed when the operation for modifying the display region is completed by performing a touch-up operation. In this embodiment, playback of the omnidirectional moving image is not resumed as soon as a touch-up operation is detected after temporarily stopping playback of the moving image, and instead, playback of the moving image is resumed automatically if a touch-down operation (i.e. an operation for modifying the display region) is not detected for a predetermined time (a predetermined period). Here, resuming playback of the moving image automatically means resuming playback of the moving image without the intervention of a user operation. Since the digital camera 100 and the display control apparatus 200 according to this embodiment are configured similarly to those of the first embodiment, description thereof has been omitted.

<Processing Content>

Figure 9:
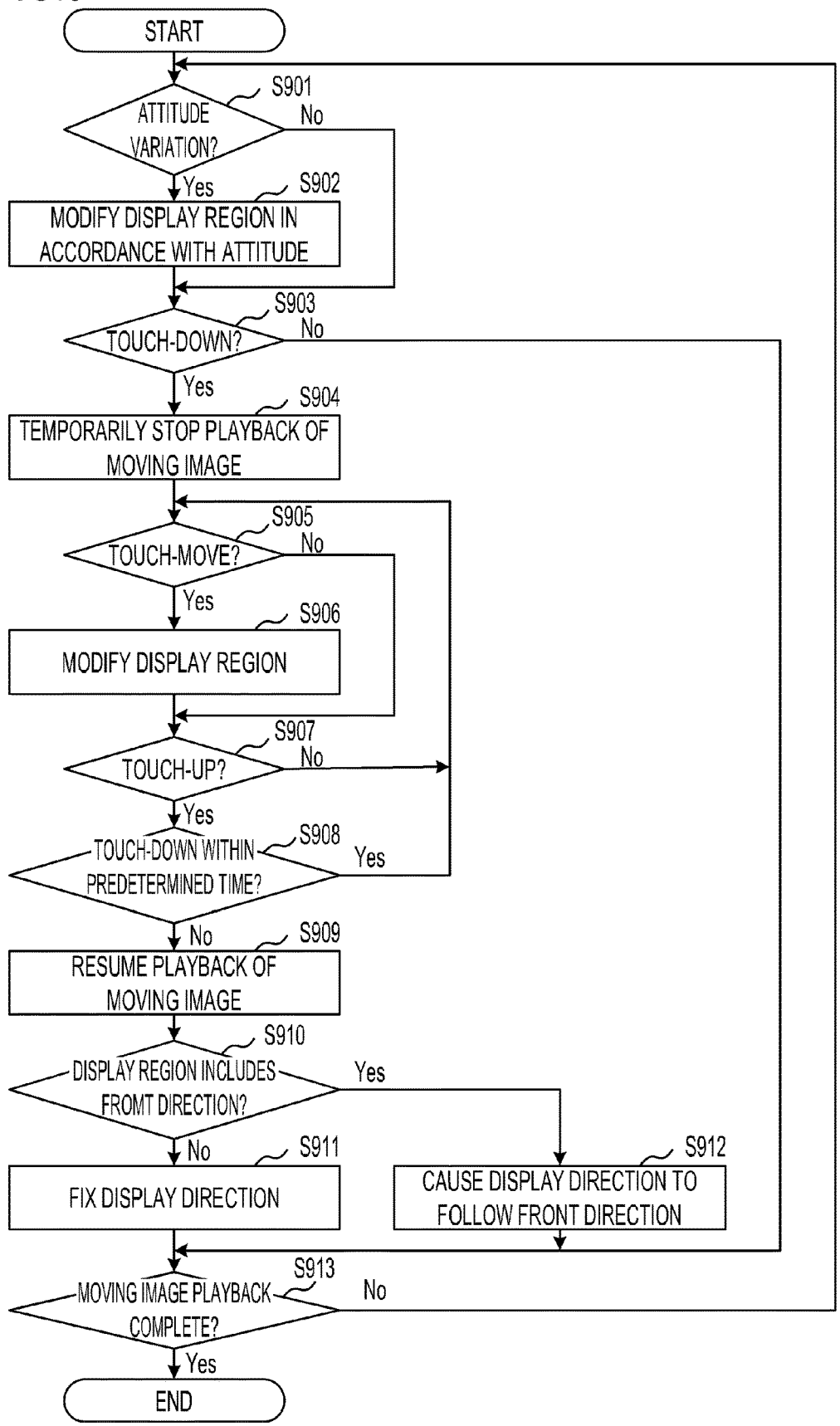
FIG. 9 is a flowchart showing an example of playback processing according to a third embodiment.

FIG. 9 shows a flowchart of the processing executed by the display control apparatus 200 in this embodiment to display an omnidirectional moving image. This processing is realized by having the CPU 201 expand the program stored in the non-volatile memory 203 in the memory 202 and execute the program. The processing shown in FIG. 9 is started when the power of the display control apparatus 200 is switched ON, an omnidirectional moving image is selected from the images recorded in the recording medium 208 or images acquired from a communication destination, and playback is specified. Processing executed in S901 to S907 and S909 to S913 of FIG. 9 is similar to the processing executed in S501 to S507 and S508 to S512 of FIG. 5, and therefore description thereof has been omitted.

In S908, the CPU 201, having determined in S907 that a touch-up operation has been performed, determines whether or not a touch-down operation has been performed on the touch panel 206a within a predetermined time. When a touch-down operation has been performed within the predetermined time, the processing returns to S905, where a touch-move operation for modifying the display region is detected again.

When a touch-down operation has not been performed within the predetermined time, the processing advances to S909, where playback of the moving image is resumed. In other words, when the predetermined time elapses without detecting a touch-down following detection of a touch-up in S907, playback of the moving image is resumed automatically.

According to this embodiment, as described above, if a touch-down operation is not performed within a predetermined time after a touch-up operation is detected, playback of the moving image is started. As a result, a situation in which playback of the moving image is resumed unintentionally in a case where the user is unable to modify the display region of the omnidirectional moving image to a desired display region by means of a single touch-move operation and attempts to modify the display region by releasing his/her finger or pen and then performing another touch-move operation can be avoided.

Fourth Embodiment

<Outline>

In the example described in the third embodiment, playback of the moving image is resumed if a touch-down operation is not performed within a predetermined time after a touch-up operation is detected. In this embodiment, when an operation (a third predetermined operation) is performed on a button displayed on the touch panel 206a after playback of the omnidirectional moving image has been temporarily stopped in response to a user operation to modify the display region, the temporarily stopped state of playback of the omnidirectional moving image is extended. The button for extending the temporarily stopped state will be referred to hereafter as a hold button. Further, if the hold button is not operated within a predetermined time after a touch-up operation is detected, it is determined that the predetermined operation performed by the user to modify the display region is complete, and playback of the moving image is resumed. Since the digital camera 100 and the display control apparatus 200 according to this embodiment are configured similarly to those of the first embodiment, description thereof has been omitted.

<Processing Content>

Figure 10:
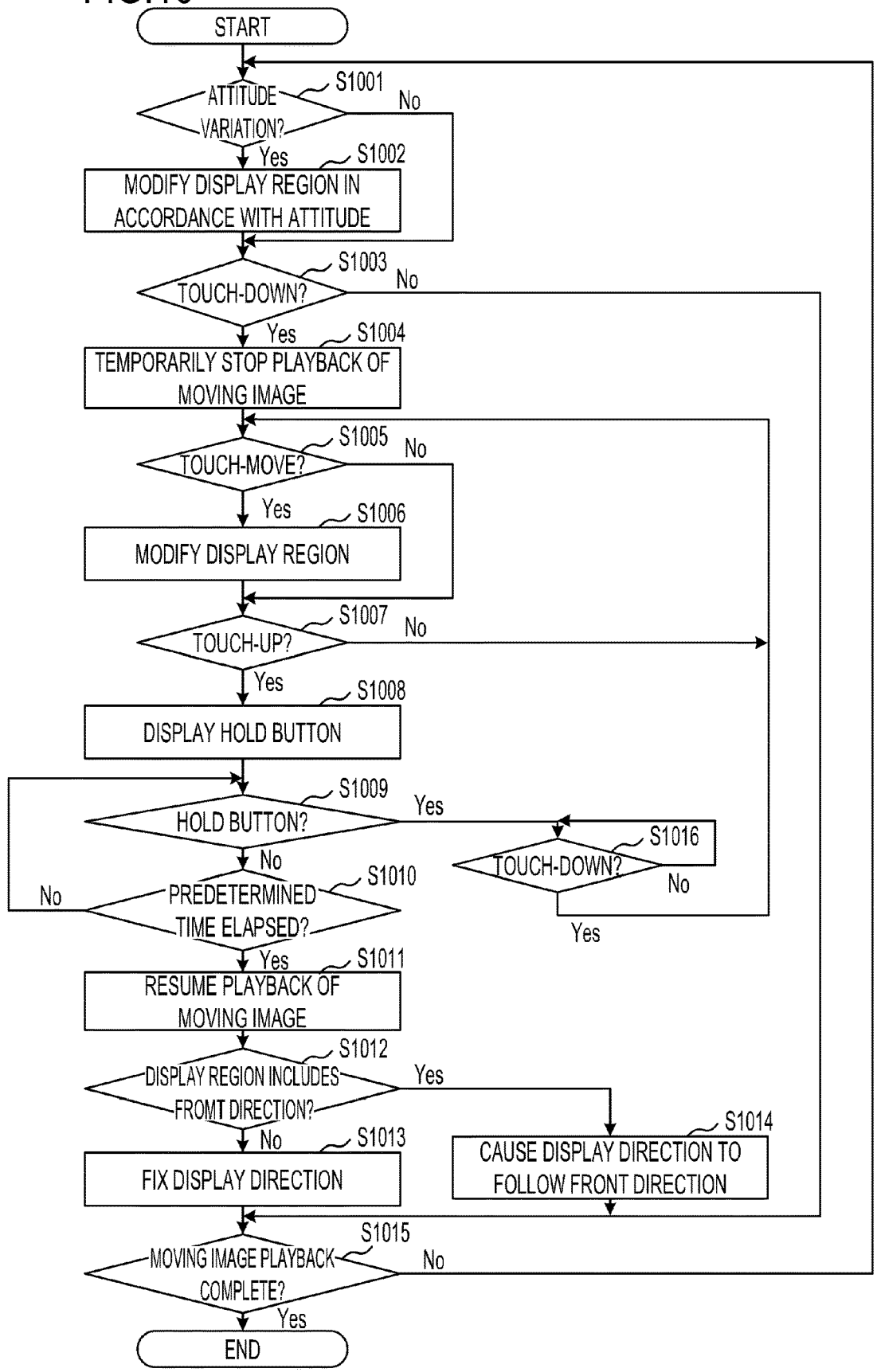
FIG. 10 is a flowchart showing an example of playback processing according to a fourth embodiment.

FIG. 10 shows a flowchart of the processing executed by the display control apparatus 200 in this embodiment to display an omnidirectional moving image. This processing is realized by having the CPU 201 expand the program stored in the non-volatile memory 203 in the memory 202 and execute the program. The processing shown in FIG. 10 is started when the power of the display control apparatus 200 is switched ON, an omnidirectional moving image is selected from the images recorded in the recording medium 208 or images acquired from a communication destination, and playback is specified.

Processing executed in S1001 to S1007 and S1012 to S1015 of FIG. 10 is similar to the processing executed in S501 to S507 and S509 to S512 of FIG. 5, and therefore description thereof has been omitted. In this embodiment, playback of the moving image is not resumed at the point where a touch-up operation is detected in S1007.

In S1008, the CPU 201 displays the hold button on the display unit 205 while keeping playback of the moving image in the temporarily stopped state. By selecting this button after performed a touch-up operation, the user can keep playback of the omnidirectional moving image in the temporarily stopped state.

In S1009, the CPU 201 determines whether or not the hold button displayed in S1008 has been operated. When the hold button has been operated, the processing advances to S1015, and when the hold button has not been operated, the processing advances to S1010.

In S1010, the CPU 201 determines whether or not a predetermined time has elapsed following detection of the touch-up operation in S1007. When the predetermined time has elapsed, the processing advances to S1011, and when the predetermined time has not elapsed, the processing returns to S1009. In other words, in this embodiment, when the user wishes to move the display region further after moving the display region by means of a single touch-move operation and then performing a touch-up operation, the user may operate the hold button.

In S1011, if a predetermined time elapses without the hold button being operated, the CPU 201 resumes playback of the moving image. In other words, after determining that the predetermined time has elapsed following detection of the touch-up operation (S1010—Yes), the CPU 201 deletes the displayed hold button and resumes playback of the moving image.

In S1016, if the hold button was operated in S1009, the CPU 201 deletes the hold button displayed on the display unit 205 and waits to detect a touch-down operation. When a touch-down operation is detected, the processing returns to S1005, where a touch-move operation is detected.

Figure 11A:
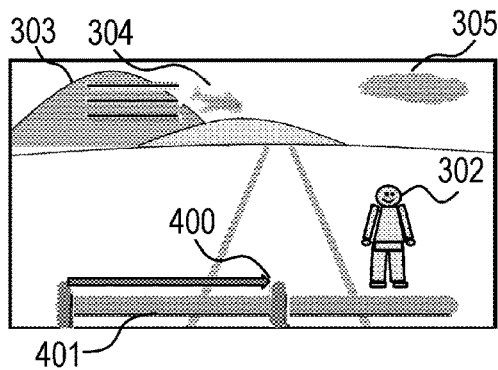
FIGS. 11A to 11H are views showing playback screens of an omnidirectional moving image according to the fourth embodiment.
Figure 11B:
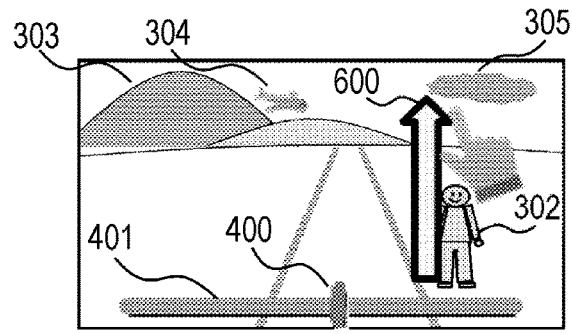
Figure 11C:
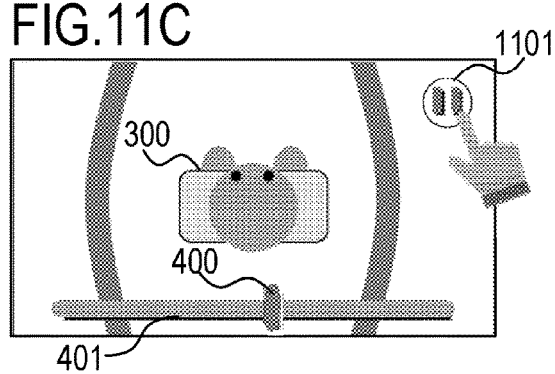

The playback processing shown in FIG. 10 will now be described using FIGS. 11A to 11F. Since FIGS. 11A and 11B are similar to FIGS. 6A and 6B, description thereof has been omitted. When the user performs a touch-up operation in order to further modify the display region, a hold button 1101 shown in FIG. 11C is displayed. At this time, the moving image remains in the temporarily stopped state. In this state, the user keeps the moving image in the temporarily stopped state by operating the hold button 1101.

Figure 11D:
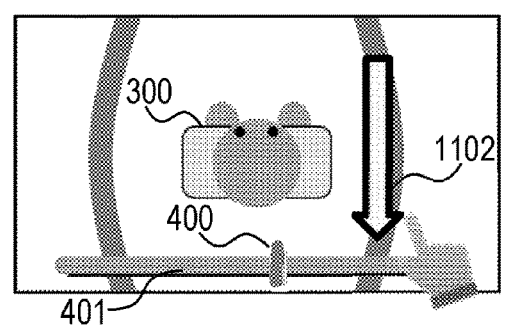
Figure 11E:
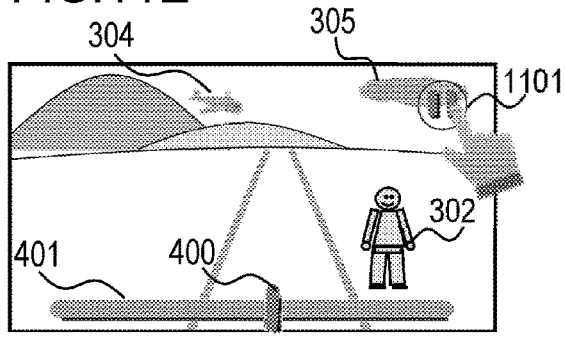

Next, when a downward sliding operation (a touch-move) indicated by an arrow 1202 in FIG. 11D is detected, the CPU 201 modifies the display region and displays a region shown in FIG. 11E on the display unit 205. When another touch-up operation is detected in this state, the hold button 1101 is displayed. If the user wishes to modify the display region further while keeping playback in the temporarily stopped state, the user may operate the hold button 1101 again.

Figure 11F:
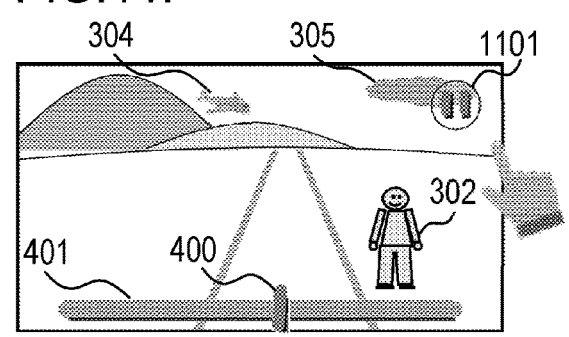
Figure 11G:
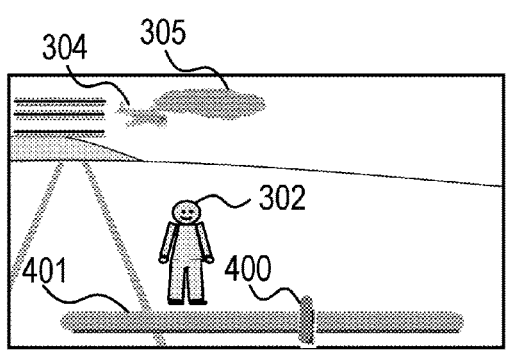
Figure 11H:
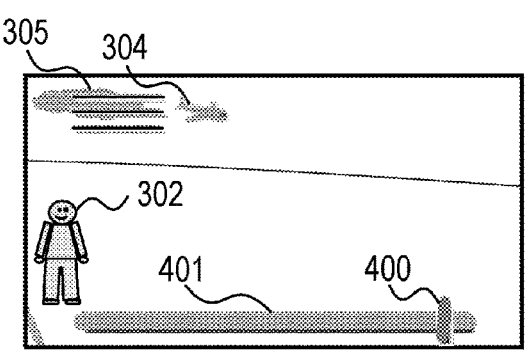

Further, as shown in FIG. 11F, when the user is happy with the current display region, the user waits for the predetermined time to elapse without operating the hold button 1101. Accordingly, as shown in FIG. 11G, playback of the moving image is released from the temporarily stopped state and playback of the moving image is resumed, after which playback of the moving image is continued, as shown in FIG. 11H.

According to this embodiment, as described above, the user can keep playback of the moving image in the temporarily stopped state by operating the hold button after moving the display region by means of a single touch-move operation. Note that in this embodiment, an example in which the hold button is displayed and operated was described, but instead, an instruction to temporarily stop playback may be received in response to a long tap operation (the third predetermined operation), which is an operation for touching the touch panel 206a continuously for at least a predetermined time. In so doing, the user can input an instruction to keep the moving image in the temporarily stopped state smoothly following a touch-move operation.

Fifth Embodiment

<Outline>

In the example described in the first embodiment, playback of the moving image is temporarily stopped when a touch-down operation is detected, and the display region is modified in response to a touch-move operation. In this embodiment, the predetermined operation for modifying the display region is a sliding operation of at least a predetermined length. Rather than temporarily stopping playback of the moving image at the point where the sliding operation is detected, the moving image is temporarily stopped when the display region is modified beyond a predetermined range in accordance with the sliding operation. More specifically, when a sliding operation of less than the predetermined length is detected, the display region is modified without temporarily stopping playback. Further, when a sliding operation (a predetermined operation) of at least the predetermined length is detected, the display region is modified after temporarily stopping playback of the moving image. Here, a sliding operation of at least a predetermined length is an operation for modifying the display region beyond a predetermined range (by at least a predetermined amount), as described above. The display region exceeds the predetermined range when a part of the display region moves outside the predetermined range, the center of the display region moves outside the predetermined range, the entire display region moves outside the predetermined range, and so on. Since the digital camera 100 and the display control apparatus 200 according to this embodiment are configured similarly to those of the first embodiment, description thereof has been omitted.

<Processing Content>

Figure 12:
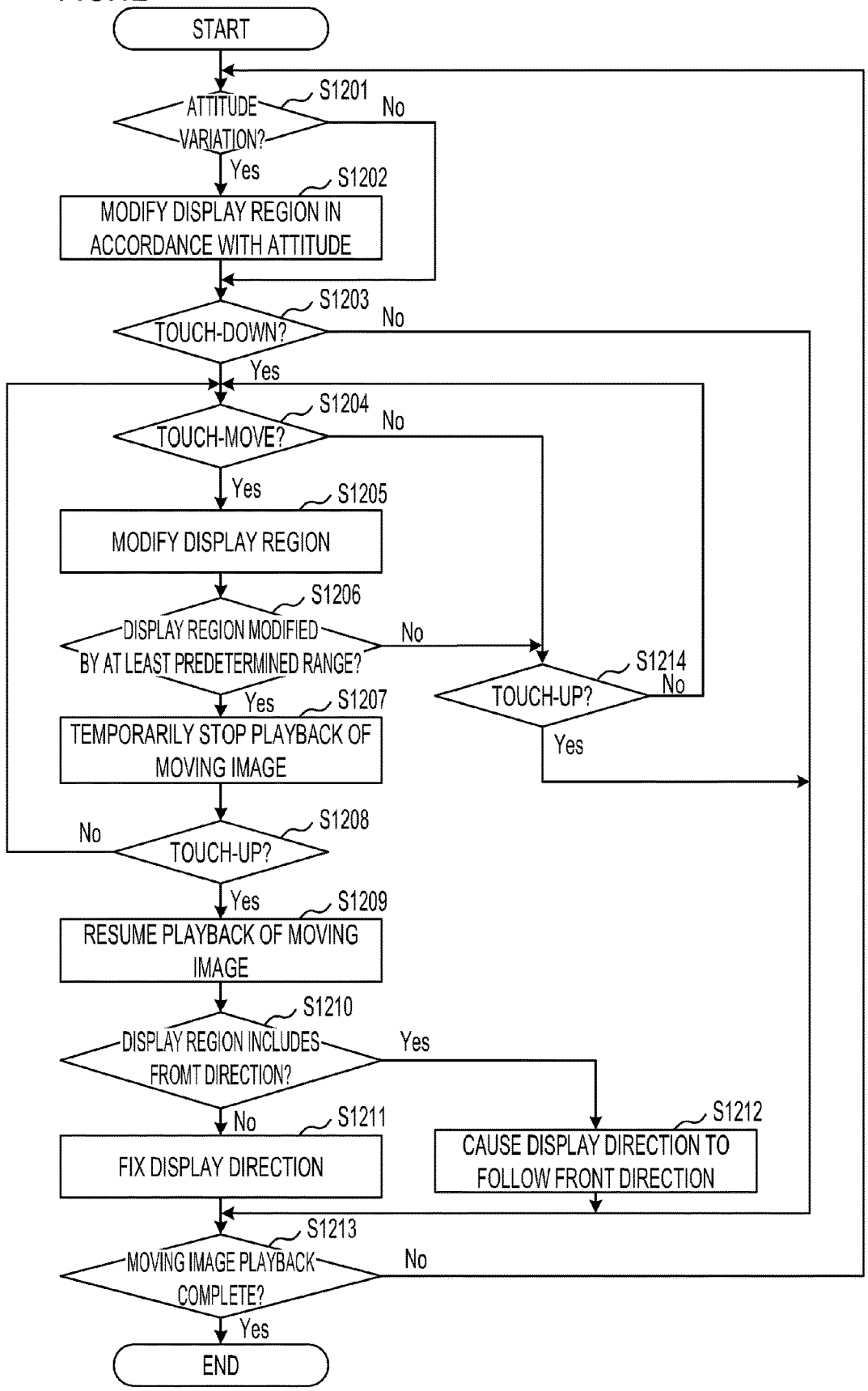
FIG. 12 is a flowchart showing an example of playback processing according to a fifth embodiment.

FIG. 12 shows a flowchart of the processing executed by the display control apparatus 200 in this embodiment to display an omnidirectional moving image. This processing is realized by having the CPU 201 expand the program stored in the non-volatile memory 203 in the memory 202 and execute the program. The processing shown in FIG. 12 is started when the power of the display control apparatus 200 is switched ON, an omnidirectional moving image is selected from the images recorded in the recording medium 208 or images acquired from a communication destination, and playback is specified. Processing executed in S1201 to S1203, S1204 to S1205, and S1208 to S1213 of FIG. 12 is similar to the processing executed in S501 to S503, S505 to S506, and S507 to S512 of FIG. 5, and therefore description thereof has been omitted. In this embodiment, processing for temporarily stopping playback of the moving image is not performed even when a touch-down operation is detected in S1203, and instead, playback is continued.

In S1206, the CPU 201 determines whether or not the display region has been modified by at least a predetermined range by the touch-move operation performed in S1204. When the display region has been modified by at least the predetermined range, the processing advances to S1207, at which point playback of the moving image is temporarily stopped (S1207). Further, when the display region has not been modified by at least the predetermined range, the processing advances to S1214. When a touch-move operation was not performed in S1204, the processing advances to S1214.

In S1214, the CPU 201 determines whether or not a touch-up operation has been performed. When a touch-up operation has been detected, the processing advances to S1213, and when a touch-up operation has not been detected, the processing returns to S1204, where a touch-move operation is detected. S1208 to S1213 are similar to S507 to S512, and therefore description thereof has been omitted.

According to this embodiment, as described above, playback of the moving image is not temporarily stopped at the point where a touch-down operation is detected. When the display region is modified by at least a predetermined range in response to a touch-move operation following the touch-down operation, playback of the moving image is temporarily stopped. As a result, a situation in which playback of the moving image is temporarily stopped in a case where the user wishes to modify the display region displayed on the display unit 205 only slightly can be avoided.

Modified Examples

In the examples described in the above embodiments, the display region is modified by touch operations performed on the display unit installed in the display control apparatus, but the display region may be modified by reception unit for a mouse operation, a button operation, or the like performed on the display control apparatus.

In the examples described in the above embodiments, the display unit is included in the display control apparatus, but the display control apparatus may execute the control described above on a display unit installed in a separate electronic device. In this case, the display control apparatus may execute the control described above in response to variation in the attitude of the separate electronic device.

Note that the various types of control described above as being executed by the system control unit 50 may be executed using a single piece of hardware, or control of the entire apparatus may be executed by apportioning the processing to a plurality of pieces of hardware (a plurality of processors or circuits, for example).

(Miscellaneous)

Furthermore, in the examples described in the above embodiments, the present invention is applied to the digital camera 100 or the display control apparatus 200. However, the present invention is not limited to these examples and may be applied to any electronic device capable of shooting or displaying VR images (wide view field images including video with a wide-range view field angle). More specifically, the present invention can also be applied to a personal computer or a PDA, a mobile telephone terminal or a portable image viewer, a printer apparatus having a display unit, a digital photo frame, a music player, a game machine, an electronic book reader, and so on.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-134914, filed on Jul. 18, 2018, which is hereby incorporated by reference herein in its entirety.

What is claimed is:

1. A display control apparatus comprising:
a processor; and
a memory storing a program which, when executed by the processor, causes the display control apparatus to:
(1) play back a moving image;
(2) display a display region on a display unit, wherein the display region is a partial region of the played-back moving image;
(3) acquire information relating to an attitude of the display unit;
(4) receive an operation to modify the display region of the moving image displayed on the display unit;
(5) modify the display region of the moving image in accordance with variation of the attitude of the display unit detected based on the acquired information or in accordance with the received operation; and
(6) stop playback of the moving image automatically while the display region of the moving image is modified if the display region of the moving image is modified in accordance with the received operation,
wherein the playback of the moving image is not stopped automatically while the display region of the moving image is modified if the display region of the moving image is modified in accordance with the variation of the attitude of the display unit detected based on the acquired information.

2. The display control apparatus according to claim 1, wherein the program when executed by the processor further causes the display control apparatus to resume playback of the moving image automatically, in a case where the operation is complete after stopping playback of the moving image.

3. The display control apparatus according to claim 1, wherein the program when executed by the processor further causes the display control apparatus to resume playback of the moving image, in a case where another operation is received after stopping playback of the moving image.

4. The display control apparatus according to claim 1, wherein the program when executed by the processor further causes the display control apparatus to resume playback of the moving image automatically, in a case where the operation is received again within a period following completion of the operation after stopping playback of the moving image.

5. The display control apparatus according to claim 1, wherein the program when executed by the processor further causes the display control apparatus to maintain a state of the stopping of playback of the moving image without resuming playback of the moving image, in a case where another operation is received within a period following completion of the operation to modify the display region of the moving image after stopping playback of the moving image.

6. The display control apparatus according to claim 1, wherein the operation is an operation for modifying the display region by at least a predetermined amount, and
wherein the predetermined amount is an amount by which the display region is modified beyond a predetermined range.

7. The display control apparatus according to claim 1, wherein the program when executed by the processor further causes the display control apparatus to:
acquire information relating to a front direction, which is a direction recognized as a front surface of an imaging apparatus during shooting of the moving image,
display a front direction region of the moving image based on the information relating to the front direction, on the display unit after resuming playback of the moving image, in a case where the display region displayed on the display unit immediately before playback of the moving image is resumed includes the front direction region of the moving image, and
display the display region immediately prior to the resumption of playback on the display unit, and not to modify the display region even if the front direction of the moving image varies after resuming playback of the moving image, in a case where the display region displayed on the display unit immediately before playback of the moving image is resumed does not include the front direction region of the moving image.

8. The display control apparatus according to claim 1, wherein the operation is a touch operation, a mouse operation, or a button operation.

9. The display control apparatus according to claim 1, wherein the display region of the moving image is modified in accordance with the variation of the attitude of the display unit without stopping playback of the moving image automatically, in a case where the variation of the attitude of the display unit is detected based on the acquired information after resuming playback of the moving image.

10. The display control apparatus according to claim 1, wherein the program when executed by the processor further causes the display control apparatus to generate a 360-degree moving image on the basis of the played-back moving image and display a partial region of a screen of the 360-degree moving image on the display unit.

11. A control method for a display control apparatus, the control method comprising:
playing back a moving image;
displaying a display region on a display unit, wherein the display region is a partial region of the played-back moving image;
acquiring information relating to an attitude of the display unit;
receiving an operation to modify the display region of the moving image displayed on the display unit;
modifying the display region of the moving image in accordance with variation of the attitude of the display unit detected based on the acquired information or in accordance with the received operation; and
stopping playback of the moving image automatically while the display region of the moving image is modified in a case that the display region of the moving image is modified in accordance with the received operation,
wherein the playback of the moving image is not stopped automatically while the display region of the moving image is modified in a case that the display region of the moving image is modified in accordance with the variation of the attitude of the display unit detected based on the acquired information.

12. A non-transitory computer-readable medium that stores a program, wherein the program causes a computer to execute a control method for a display control apparatus, the control method comprising:
playing back a moving image;
displaying a display region on a display unit, wherein the display region is a partial region of the played-back moving image;
acquiring information relating to an attitude of the display unit;
receiving an operation to modify the display region of the moving image displayed on the display unit;
modifying the display region of the moving image in accordance with variation of the attitude of the display unit detected based on the acquired information or in accordance with the received operation; and
stopping playback of the moving image automatically while the display region of the moving image is modified in a case that the display region of the moving image is modified in accordance with the received operation,
wherein the playback of the moving image is not stopped automatically while the display region of the moving image is modified in a case that the display region of the moving image is modified in accordance with the variation of the attitude of the display unit detected based on the acquired information.

* * * * *